(12) United States Patent
Ueno

(10) Patent No.: US 9,235,183 B2
(45) Date of Patent: Jan. 12, 2016

(54) DRIVING FORCE TRANSMISSION DEVICE THAT PROVIDES A DELAY BETWEEN SEPARATION OF A FIRST DRIVING MEMBER AND SEPARATION OF A SECOND DRIVING MEMBER, AND IMAGE FORMING APPARATUS INCLUDING THE SAME

(71) Applicant: KYOCERA DOCUMENT SOLUTIONS INC., Osaka (JP)

(72) Inventor: Daijiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/228,084

(22) Filed: Mar. 27, 2014

(65) Prior Publication Data

US 2014/0294445 A1 Oct. 2, 2014

(30) Foreign Application Priority Data

Mar. 28, 2013 (JP) .................................. 2013-069782

(51) Int. Cl.
G03G 15/01 (2006.01)
G03G 15/00 (2006.01)
G03G 21/16 (2006.01)
(Continued)

(52) U.S. Cl.
CPC .............. *G03G 15/757* (2013.01); *F16H 21/40* (2013.01); *G03G 21/1647* (2013.01); *G03G 21/1671* (2013.01); *G03G 21/1676* (2013.01); *G03G 21/1857* (2013.01); *G03G 15/0178* (2013.01); *G03G 15/5008* (2013.01); *G03G 2215/0119* (2013.01); *Y10T 74/18184* (2015.01)

(58) Field of Classification Search
CPC ............. G03G 21/186; G03G 21/1671; G03G 21/1857
See application file for complete search history.

(56) References Cited

U.S. PATENT DOCUMENTS

| 5,699,768 | A | * | 12/1997 | Saito et al. | ..................... 123/400 |
| 8,090,296 | B2 | | 1/2012 | Ito et al. | |
| 2006/0093398 | A1 | * | 5/2006 | Hayakawa | ..................... 399/111 |
| 2008/0199212 | A1 | * | 8/2008 | Tsui et al. | ..................... 399/111 |

(Continued)

FOREIGN PATENT DOCUMENTS

| EP | 1970775 A2 | 9/2008 |
| JP | 2003-280489 | * 10/2003 ............. G03G 21/16 |

(Continued)

OTHER PUBLICATIONS

The extended European search report issued by the European Patent Office on Feb. 5, 2015, which corresponds to European Patent Application No. 14161077A-1560 and is related to U.S. Appl. No. 14/228,084.

(Continued)

*Primary Examiner* — Clayton E Laballe
*Assistant Examiner* — Kevin Butler
(74) *Attorney, Agent, or Firm* — Studebaker & Brackett PC

(57) ABSTRACT

A driving force transmission device includes a first driving member, a second driving member, a moving member, and a connection drive section. The connection drive section separates, in conjunction with movement of the moving member in a first direction, the first driving member and the second driving member respectively from a first rotating member and a second rotating member in such a manner as to cause a time difference between a separating operation for separating the first driving member from the first rotating member and a separating operation for separating the second driving member from the second rotating member.

13 Claims, 16 Drawing Sheets

(51) Int. Cl.
  *G03G 21/18* (2006.01)
  *F16H 21/40* (2006.01)

(56) References Cited

U.S. PATENT DOCUMENTS

2008/0226345 A1  9/2008  Yoon
2009/0123181 A1  5/2009  Ito et al.

FOREIGN PATENT DOCUMENTS

| JP | 2003-280489 A | 10/2003 |
| JP | 2005-157113 A | 6/2005 |
| JP | 2009-116153 A | 5/2009 |
| JP | 2012-058760 A | 3/2012 |
| JP | 2012-177840 A | 9/2012 |

OTHER PUBLICATIONS

An Office Action; "Notice of Reasons for Rejection," issued by the Japanese Patent Office on Aug. 4, 2015, which corresponds to Japanese Patent Application No. 2013-069782 and is related to U.S. Appl. No. 14/228,084.

* cited by examiner

DRIVING FORCE TRANSMISSION DEVICE THAT PROVIDES A DELAY BETWEEN SEPARATION OF A FIRST DRIVING MEMBER AND SEPARATION OF A SECOND DRIVING MEMBER, AND IMAGE FORMING APPARATUS INCLUDING THE SAME

INCORPORATION BY REFERENCE

The present application claims priority under 35 U.S.C. §119 to Japanese Patent Application No. 2013-069782, filed on Mar. 28, 2013. The contents of this application are incorporated herein by reference in their entirety.

BACKGROUND

The present disclosure relates to a driving force transmission device for transmitting a driving force to a rotating body, and an image forming apparatus including the same.

In image forming apparatuses for forming images on sheets, various rotating bodies are driven and rotated in general. As such rotating bodies, a photoconductive drum and a development roller disposed in a developing unit are provided in an apparatus main body of an image forming apparatus. The development roller is rotatably supported in the developing unit. The rotation axis of the photoconductive drum and the rotation axis of the development roller are disposed in parallel to each other.

The photoconductive drum and the developing unit are attachable to and detachable from the apparatus main body. Therefore, coupling gears for respectively transmitting driving forces to the photoconductive drum and the development roller should be separated respectively from the photoconductive drum and the development roller in detaching them.

In some image forming apparatuses, an operation to connect/separate a driving force transmission member to/from a rotating body is executed in conjunction with an opening/closing cover of an apparatus main body.

SUMMARY

A driving force transmission device according to one aspect of the present disclosure includes a first driving member, a second driving member, a moving member and a connection drive section. The first driving member is configured to rotate a first rotating member around a first rotation axis. The first driving member is provided coaxially with the first rotation axis, and is connectable/separable to/from the first rotating member in an axial direction of the first rotation axis. The second driving member is configured to rotate a second rotating member around a second rotation axis parallel to the first rotation axis. The second driving member is provided coaxially with the second rotation axis, and is connectable/separable to/from the second rotating member in an axial direction of the second rotation axis. The moving member is movable in a first direction. The connection drive section executes, in conjunction with movement of the moving member in the first direction, a separating operation for separating the first driving member from the first rotating member and a separating operation for separating the second driving member from the second rotating member. The connection drive section separates the first driving member and the second driving member respectively from the first rotating member and the second rotating member in such a manner as to cause a time difference between the separating operation for the first driving member and the separating operation for the second driving member.

An image forming apparatus according to another aspect of the present disclosure includes an apparatus main body, an image forming section, a driving force transmission device according to the aforementioned aspect, the first rotating member and the second rotating member. The image forming section is provided in the apparatus main body for forming an image on a sheet. The driving force transmission device is provided in the apparatus main body.

DETAILED DESCRIPTION

Figure 1:
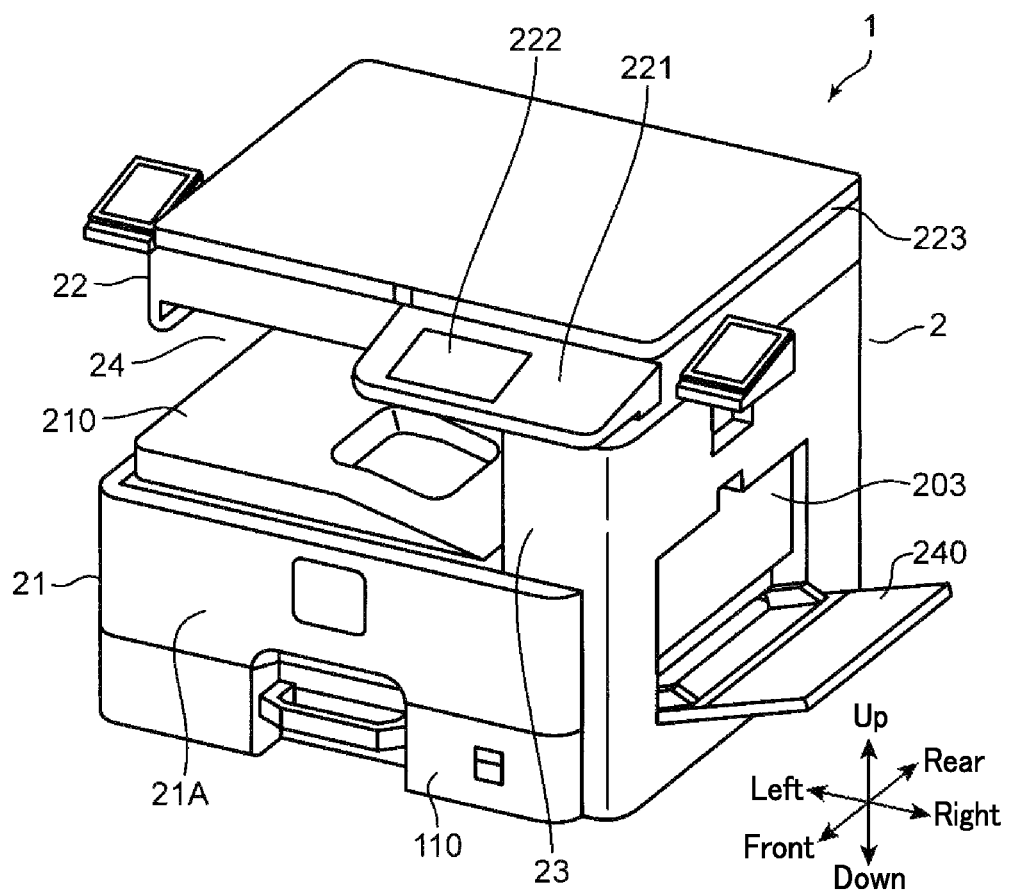
FIG. 1 is a perspective view of an image forming apparatus according to an embodiment of the present disclosure.
Figure 2:
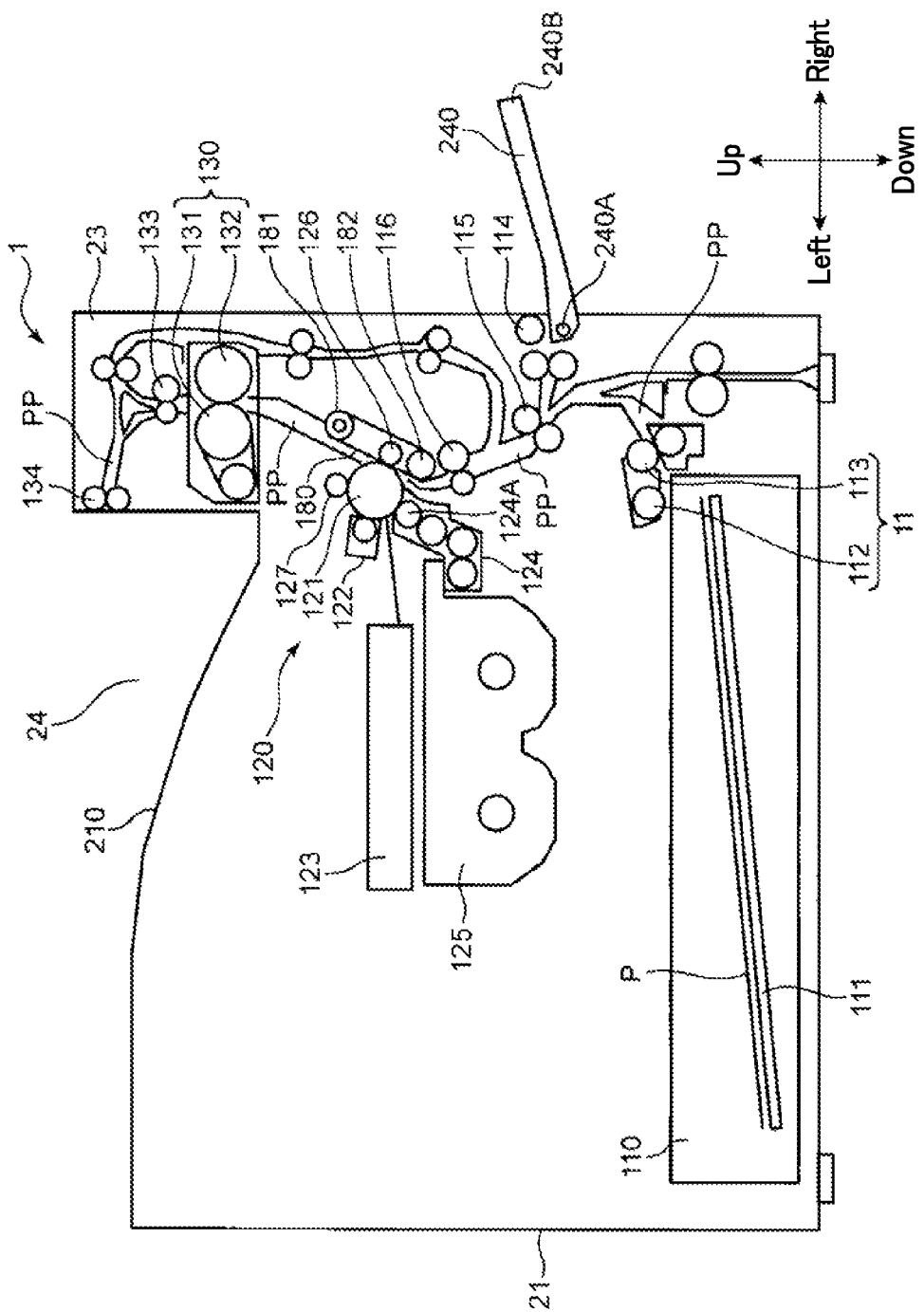
FIG. 2 is a schematic cross-sectional view illustrating the internal configuration of the image forming apparatus of the embodiment.

One embodiment of the present disclosure will now be described with reference to the accompanying drawings. It is noted that in the drawings, like reference numerals are used to refer to like or corresponding elements for avoiding redundant description. FIG. 1 is a perspective view of an image forming apparatus 1 according to one embodiment of the present disclosure. FIG. 2 is a schematic diagram illustrating the internal configuration of the image forming apparatus 1 of FIG. 1. Incidentally, an upper housing 22 of FIG. 1 is not illustrated in FIG. 2.

The image forming apparatus 1 illustrated in FIGS. 1 and 2 is what is called a black and white printer. In another embodiment, however, the image forming apparatus may be a color printer, a facsimile machine, a multifunction peripheral having the functions of these machines, or another apparatus for forming a toner image on a sheet.

Incidentally, terms used in the following description for expressing directions, such as "above", "below", "front", "rear", "left" and "right", are used simply for purpose of clarifying the description and are not intended to limit the principle of the image forming apparatus at all. Besides, in the following description, a term "sheet" means copying paper, coated paper, an OHP sheet, thick paper, a postcard, tracing paper, another sheet material to be subjected to image formation processing, or a sheet material subjected to arbitrary processing other than the image formation processing.

The image forming apparatus 1 includes a main housing 2 in the shape of a substantially rectangular parallelepiped. The main housing 2 includes a lower housing 21 (corresponding to an apparatus main body) in the shape of a substantially rectangular parallelepiped, the upper housing 22 in the shape of a substantially rectangular parallelepiped, and a connection housing 23. The upper housing 22 is disposed above the lower housing 21. The connection housing 23 connects the lower housing 21 and the upper housing 22 to each other. The connection housing 23 extends along the right edge and the rear edge of the main housing 2. A sheet having been subjected to print processing is exited to an exit space 24 surrounded by the lower housing 21, the upper housing 22 and the connection housing 23.

An operation section 221 protrudes beyond a front surface of the upper housing 22, and includes, for example, an LCD touch panel 222. The operation section 221 is configured so that information about the image formation processing can be input therethrough. A user can input, for example, the number of sheets to be printed or print density through the LCD touch panel 222. In the upper housing 22, a device for reading an image of an original document and an electronic circuit for controlling the entire image forming apparatus 1 are housed.

An original cover 223 is disposed on the upper housing 22 to be used for holding an original document down. The original cover 223 is vertically rotatably attached to the upper housing 22. A user rotationally moves the original cover 223 upward, and places an original document on the upper housing 22. Thereafter, the user operates the operation section 221, so that an image of the original document can be read by the device provided in the upper housing 22.

On a right side surface 203 of the lower housing 21, a manual feed tray 240 is provided. The manual feed tray 240 has an upper edge 240B (see FIG. 2) vertically rotatable with a lower edge 240A used as a fulcrum. When the upper edge 240B is rotationally moved downward so that the manual feed tray 240 can be in a position protruding rightward beyond the lower housing 21, a user can put a sheet on the manual feed tray 240. The sheet thus put on the manual feed tray 240 is brought into the lower housing 21 and then subjected to the image formation processing on the basis of an instruction input by the user through the operation section 221, and is finally exited to the exit space 24.

The image forming apparatus 1 further includes a cover 21A. The cover 21A defines a front surface portion of the lower housing 21 and is configured to be able to open/close the lower housing. When the cover 21A opens the lower housing 21, a photoconductive drum 121 and a developing unit 124 including a development roller 124A described later are detached from the lower housing 21. On the other hand, when the cover 21A closes the lower housing 21, the photoconductive drum 121 and the developing unit 124 are housed in the lower housing 21.

Referring to FIG. 2, the image forming apparatus 1 includes a cassette 110, a paper feed section 11, a second paper feed roller 114, an intermediate roller pair 115, a registration roller pair 116, and an image forming section 120. The paper feed section 11 includes a pickup roller 112 and a first paper feed roller 113. The paper feed section 11 feeds a sheet P to a sheet conveyance path PP. The sheet conveyance path PP is a conveyance path provided to extend from the paper feed section 11 via the intermediate roller pair 115 and the registration roller pair 116 to pass through a transfer position disposed in the image forming section 120.

The cassette 110 holds sheets P therein. The cassette 110 can be drawn from the lower housing 21 frontward (i.e., forward in the vertical direction to the surface of FIG. 2). Each sheet P held in the cassette 110 is fed upward in the lower housing 21. Thereafter, the sheet P is subjected to the image formation processing in the lower housing 21 on the basis of an instruction input by a user through the operation section 221, and is exited to the exit space 24. The cassette 110 includes a lifting plate 111 for supporting the sheets P. The lifting plate 111 is inclined so as to push the leading edge of the sheet P upward.

The pickup roller 112 comes into contact with the leading edge of the sheet P pushed upward by the lifting plate 111. When the pickup roller 112 is rotated, the sheet P is drawn out of the cassette 110.

The first paper feed roller pair 113 is disposed downstream from the pickup roller 112 in a conveyance direction of the sheet P (hereinafter referred to as the "sheet conveyance direction"). The first paper feed roller pair 113 feeds the sheet P further downstream. The second paper feed roller 114 is disposed inside the manual feed tray 240. The second paper feed roller 114 draws a sheet P put on the manual feed tray 240 into the lower housing 21. A user can selectively use a sheet P held in the cassette 110 or a sheet P put on the manual feed tray 240.

The intermediate roller pair 115 is disposed downstream from the first paper feed roller pair 113 and the second paper feed roller 114 in the sheet conveyance direction. The intermediate roller pair 115 conveys the sheet P having been fed by the first paper feed roller pair 113 or the second paper feed roller 114 further downstream.

The registration roller pair 116 defines the position of a sheet in a direction perpendicular to the sheet conveyance direction. As a result, the position of an image to be formed on the sheet P can be adjusted. A nip is formed between one roller and the other roller of the registration roller pair 116. The registration roller pair 116 conveys the sheet P to the image forming section 120 in accordance with timing for transferring a toner image onto the sheet P in the image forming section 120. Besides, the registration roller pair 116 has a function to correct skew of the sheet P.

Referring to FIG. 2, the image forming section 120 is disposed in the lower housing 21 for forming an image on the sheet P. The image forming section 120 includes the photoconductive drum 121 (corresponding to a first rotating member and an image bearing member), a charging unit 122, an exposing unit 123, the developing unit 124, a toner container 125, a transfer roller 126, a conveyor belt 180, and a cleaning unit 127.

The photoconductive drum 121 is in a substantially cylindrical shape. On the surface of the photoconductive drum 121, an electrostatic latent image is formed. Specifically, the photoconductive drum 121 is scanned by a polygon mirror (not shown) of the exposing unit 123 described later. As a result, an electrostatic latent image is formed on the surface of the photoconductive drum 121. Then, the photoconductive drum 121 bears a toner image corresponding to the electrostatic latent image.

A specific voltage is applied to the charging unit 122. Then, the charging unit 122 substantially uniformly charges the circumferential surface of the photoconductive drum 121. The exposing unit 123 irradiates, with laser light, the circumferential surface of the photoconductive drum 121 having been charged by the charging unit 122. The laser light is irradiated in accordance with image data output from an external device (not shown), such as a personal computer, communicably connected to the image forming apparatus 1. As a result, an electrostatic latent image corresponding to the image data is formed on the circumferential surface of the photoconductive drum 121.

The developing unit 124 supplies a toner to the circumferential surface of the photoconductive drum 121 on which the electrostatic latent image has been formed. The toner container 125 supplies the toner to the developing unit 124. The toner container 125 supplies the toner to the developing unit 124 successively or as occasion demands. When the developing unit 124 supplies the toner to the photoconductive drum 121, the electrostatic latent image having been formed on the circumferential surface of the photoconductive drum 121 is developed (visualized). As a result, a toner image is formed on the circumferential surface of the photoconductive drum 121. The developing unit 124 includes the development roller 124A (corresponding to a second rotating member and a developing member). The development roller 124A bears the toner on the surface thereof and is rotated to supply the toner to the photoconductive drum 121.

The transfer roller 126 is provided in the transfer position so as to oppose the circumferential surface of the photoconductive drum 121. The transfer roller 126 is disposed to be in contact with the inner circumferential surface of the conveyor belt 180 and to oppose the photoconductive drum 121.

The conveyor belt 180 is an endless belt. The conveyor belt 180 is driven and rotated with the sheet P held on the surface thereof so as to convey the sheet P to the transfer position. The conveyor belt 180 transmits a rotating driving force to the transfer roller 126 via the inner circumferential surface thereof. The conveyor belt 180 is wound between a tension roller 182 and a drive roller 181 respectively disposed upstream and downstream from the transfer roller 126 in the sheet conveyance direction. To the drive roller 181, a rotating driving force is transmitted from a drive unit not shown, so that the drive roller 181 can rotate the conveyor belt 180. The transfer roller 126 and the tension roller 182 are rotated together with and at the same speed as the conveyor belt 180. When the sheet P passes through the transfer position, the toner image having been formed on the circumferential surface of the photoconductive drum 121 is transferred onto the sheet P.

The cleaning unit 127 removes the toner remaining on the circumferential surface of the photoconductive drum 121 after transferring the toner image onto the sheet P. The circumferential surface of the photoconductive drum 121 having been cleaned by the cleaning unit 127 passes below the charging unit 122 again to be uniformly charged. Thereafter, a fresh toner image is to be formed thereon.

The image forming apparatus 1 further includes a fixing unit 130 downstream from the image forming section 120 in the sheet conveyance direction. The fixing unit 130 fixes, onto the sheet P, the toner image having been transferred to the sheet P. The fixing unit 130 includes a heating roller 131 for melting the toner on the sheet P, and a pressure roller 132 for pressing the sheet P against the heating roller 131. When the sheet P passes between the heating roller 131 and the pressure roller 132, the toner image is fixed onto the sheet P.

The image forming apparatus 1 further includes a conveyance roller pair 133 and an exit roller pair 134. The conveyance roller pair 133 is provided downstream from the fixing unit 130 in the sheet conveyance direction. The exit roller pair 134 is provided downstream from the conveyance roller pair 133 in the sheet conveyance direction. The sheet P is exited from the lower housing 21 by the conveyance roller pair 133 and the exit roller pair 134. The sheet P thus exited from the lower housing 21 is piled on an upper surface 210.

Figure 3:
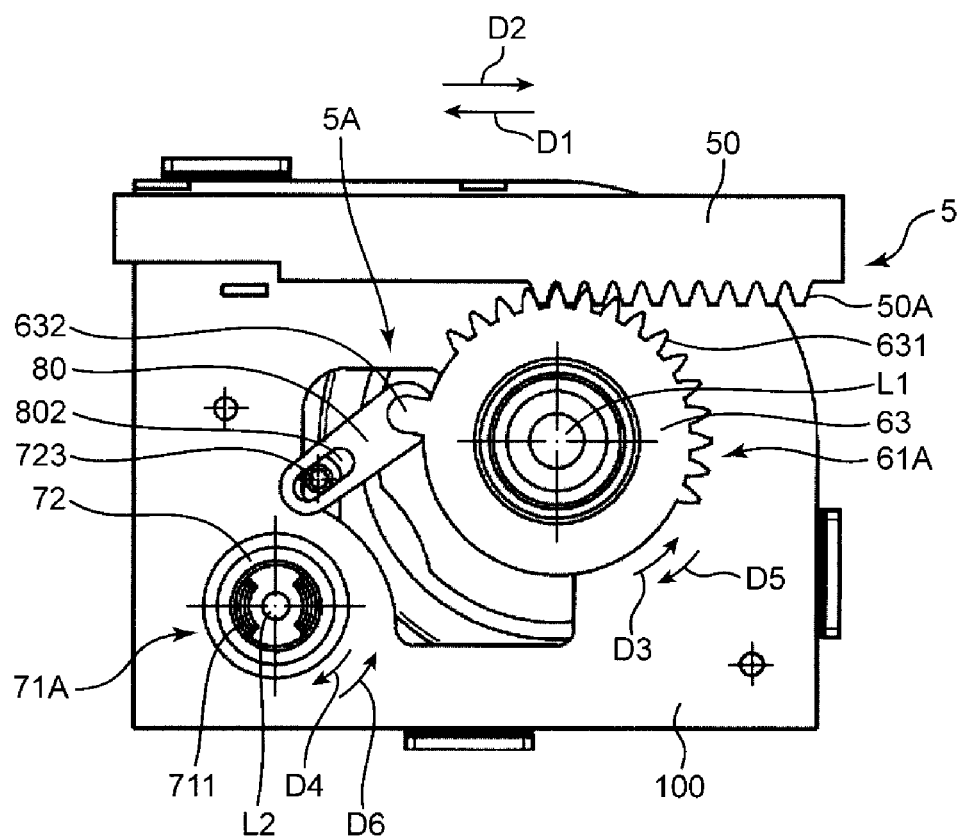
FIG. 3 is a front view of a driving force transmission device of the embodiment.
Figure 4:
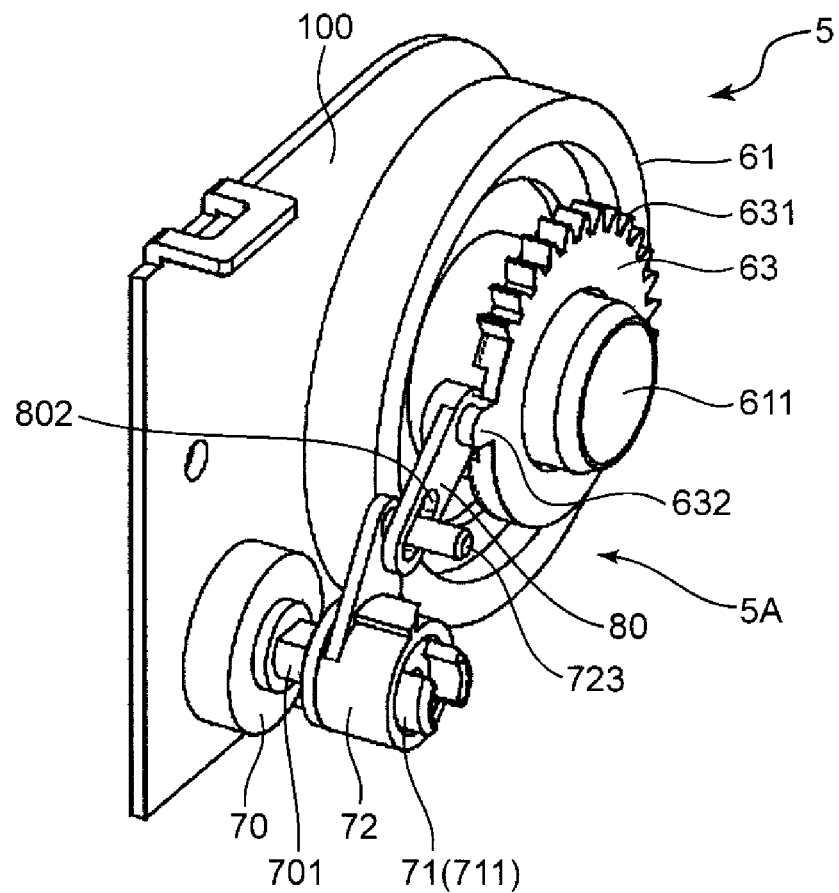
FIG. 4 is a perspective view of the driving force transmission device of the embodiment.
Figure 5:
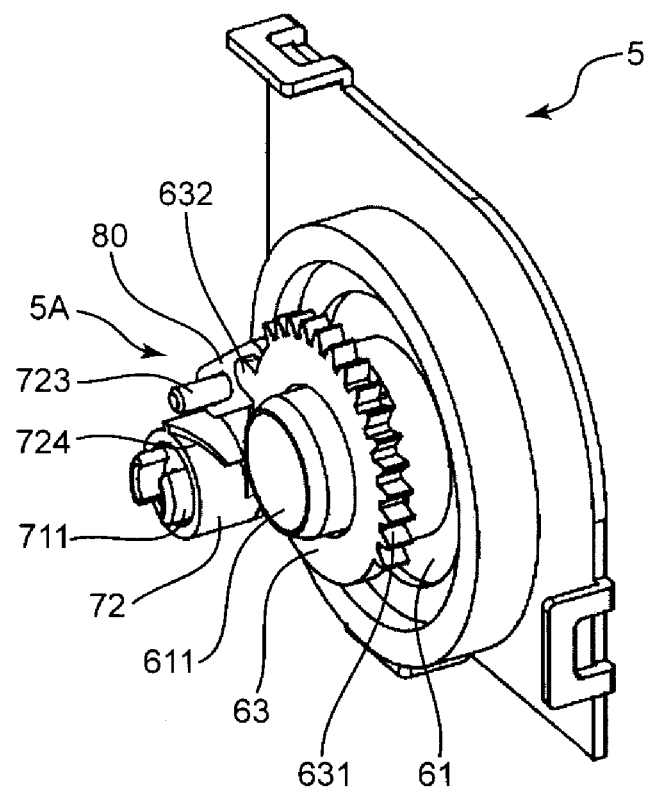
FIG. 5 is another perspective view of the driving force transmission device of the embodiment.
Figure 6:
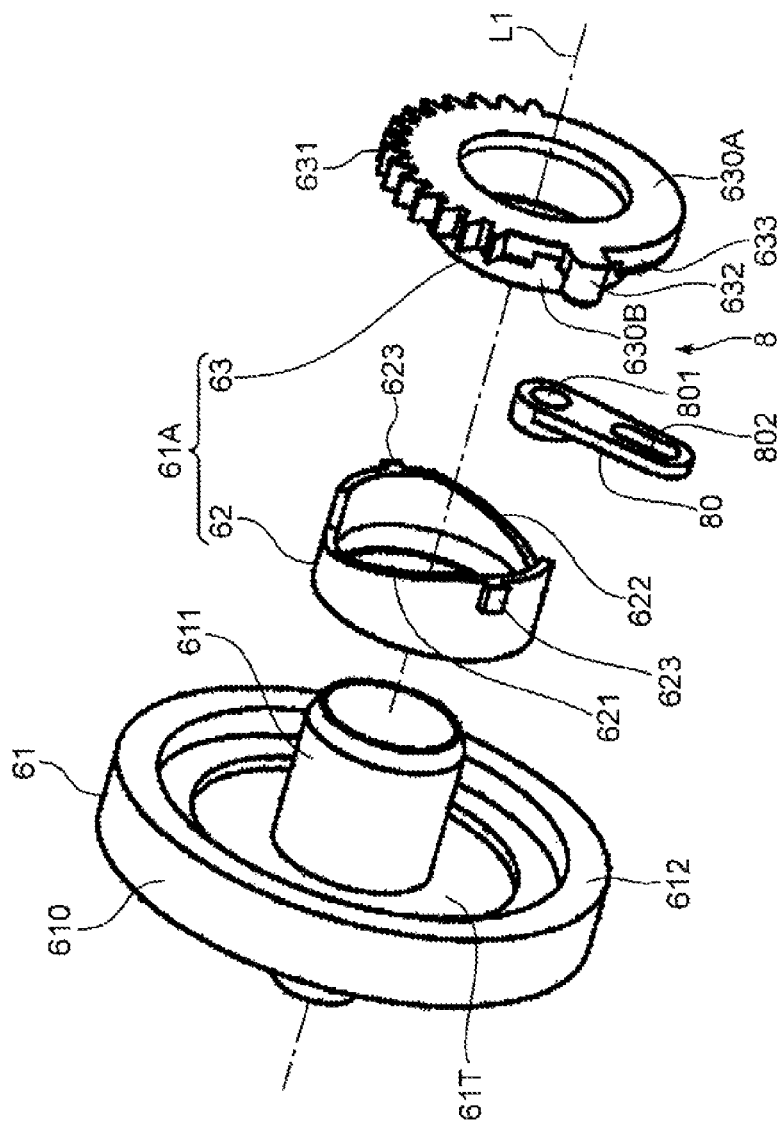
FIG. 6 is an exploded perspective view of a driving force transmission section for transmitting a driving force to a photoconductive drum in the driving force transmission device of the embodiment.
Figure 7:
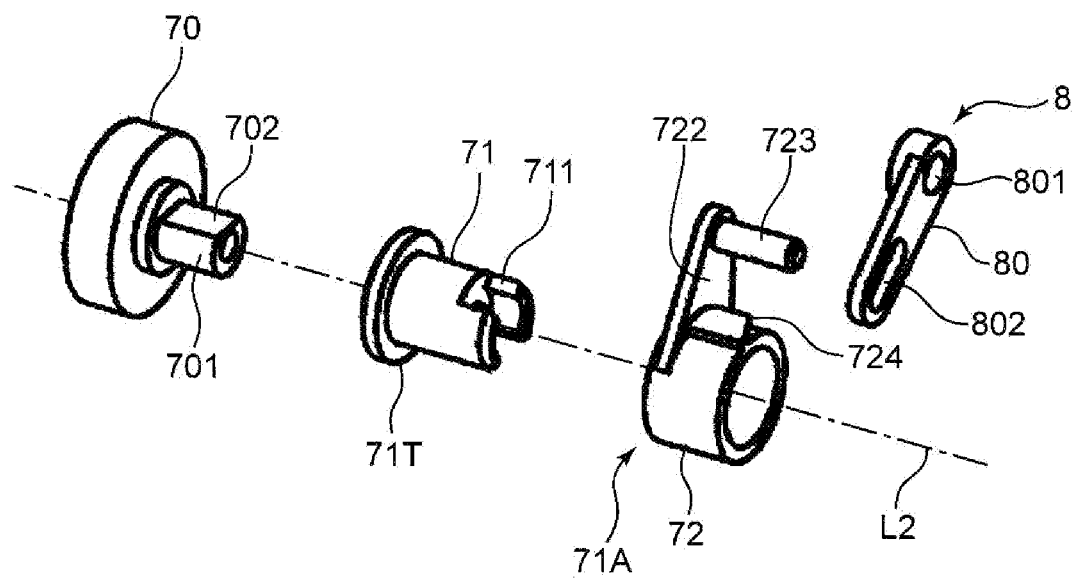
FIG. 7 is an exploded perspective view of a driving force transmission section for transmitting a driving force to a development roller in the driving force transmission device of the embodiment.
Figure 8B:
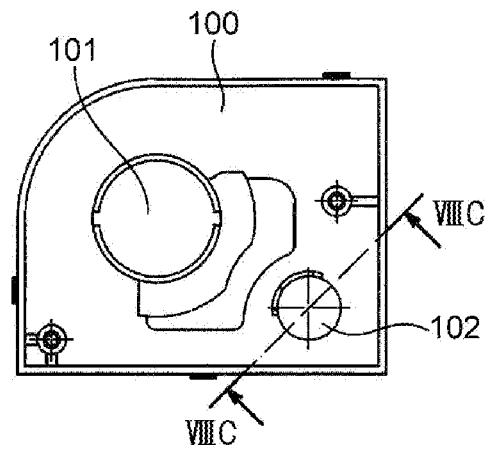
FIG. 8B is a front view thereof.
Figure 8A:
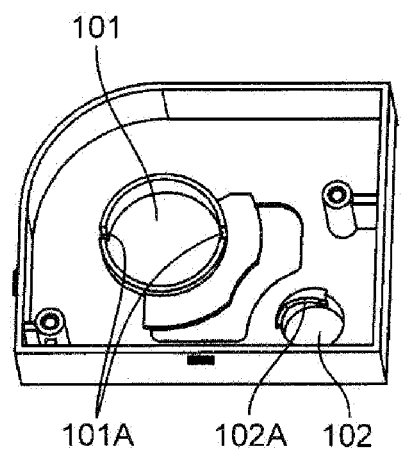
FIG. 8A is a perspective view of a frame of the driving force transmission device of the embodiment.
Figure 8C:
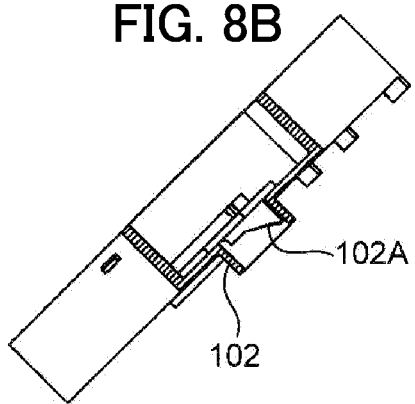
FIG. 8C is a cross-sectional view thereof.
Figure 9:
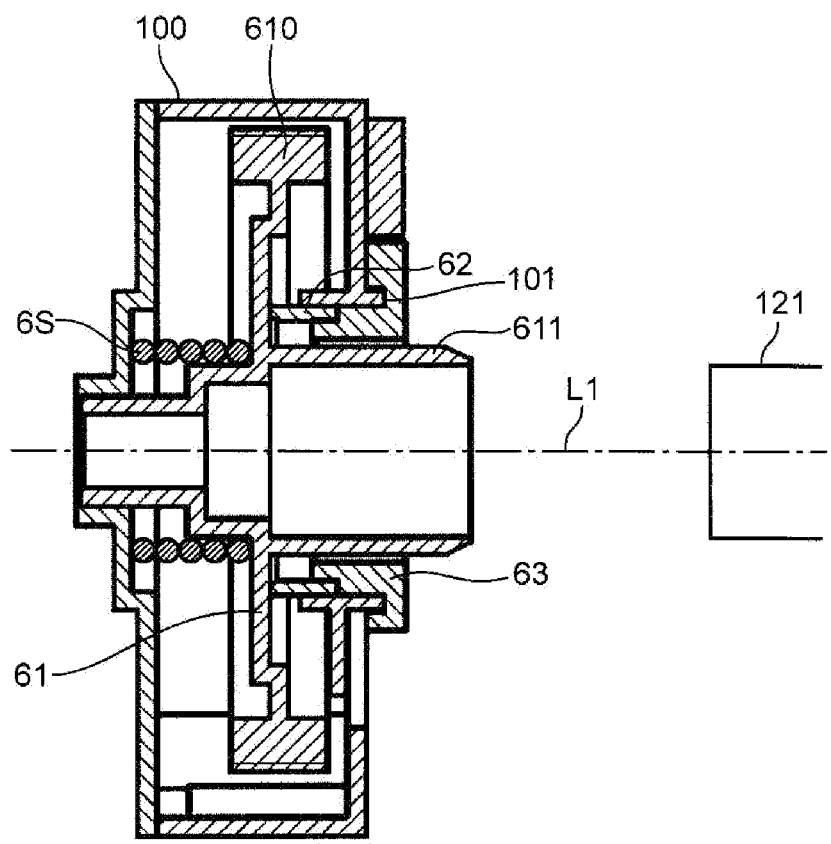
FIG. 9 is a cross-sectional view of the driving force transmission section for transmitting a driving force to the photoconductive drum in the driving force transmission device of the embodiment.
Figure 10:
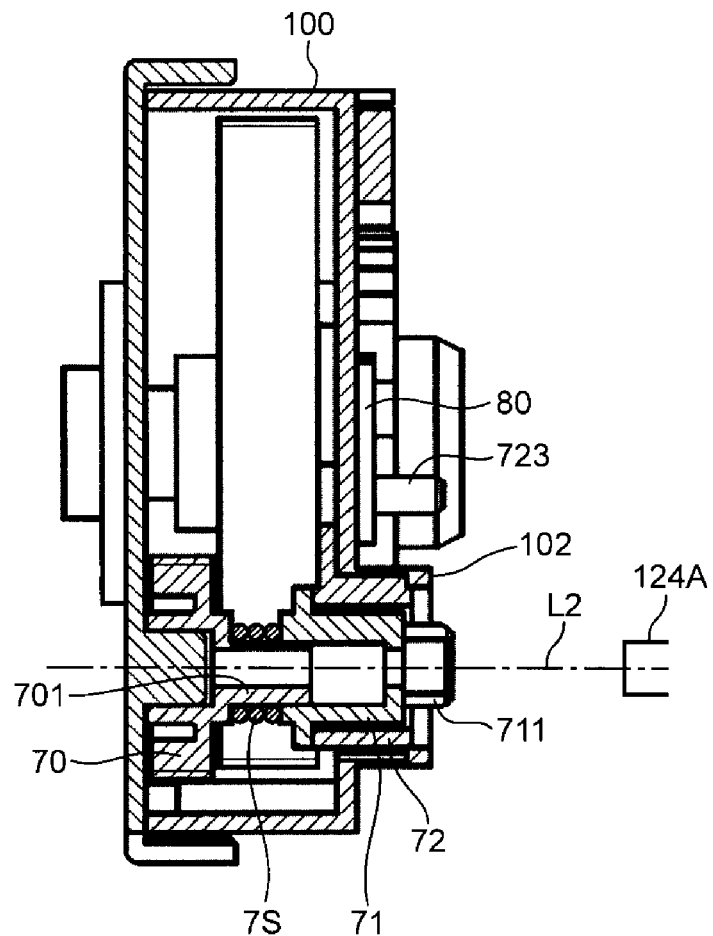
FIG. 10 is a cross-sectional view of the driving force transmission section for transmitting a driving force to the development roller in the driving force transmission device of the embodiment.

Next, referring to FIGS. 3 to 10, a driving force transmission device 5 according to the present embodiment will be described. FIG. 3 is a front view of the driving force transmission device 5 of the present embodiment. FIGS. 4 and 5 are perspective views of the driving force transmission device 5. FIG. 6 is an exploded perspective view of a driving force transmission section for transmitting a driving force to the photoconductive drum 121 in the driving force transmission device 5 of the embodiment. FIG. 7 is an exploded perspective view of a driving force transmission section for transmitting a driving force to the development roller 124A in the driving force transmission device 5. FIGS. 8A and 8B are respectively a perspective view and a front view of a drive frame 100 of the driving force transmission device 5. FIG. 8C is a cross-sectional view taken on line VIII-VIII of FIG. 8B. FIG. 9 is a cross-sectional view of the driving force transmission section for transmitting a driving force to the photoconductive drum 121 in the driving force transmission device 5. FIG. 10 is a cross-sectional view of the driving force transmission section for transmitting a driving force to the development roller 124A in the driving force transmission device 5.

As illustrated in FIG. 3, the image forming apparatus 1 (see FIG. 2) includes the driving force transmission device 5 provided in the lower housing 21. The driving force transmission device 5 transmits rotating driving forces to the photoconductive drum 121 and the development roller 124A (see FIG. 2). As illustrated in FIG. 9, the photoconductive drum 121 rotates around a drum rotation axis L1 (corresponding to a first rotation axis) (see FIGS. 3, 6 and 9). Besides, as illustrated in FIG. 10, the development roller 124A rotates around a roller rotation axis L2 (corresponding to a second rotation axis) (see FIGS. 3, 7 and 10) parallel to the drum rotation axis L1. The drum rotation axis L1 and the roller rotation axis L2 are rotation axes extending in the front-to-back direction within the lower housing 21 of the image forming apparatus 1.

As illustrated in FIGS. 3 to 5, the driving force transmission device 5 includes the drive frame 100 (corresponding to a frame), a drum driving gear 61 (corresponding to a first driving member), a development driving gear 70, a development coupling 71 (corresponding to a second driving member), a rack 50 (corresponding to a moving member), and a connection drive section 5A.

The drive frame 100 is a substantially rectangular plate-shaped member provided perpendicularly to the drum rotation axis L1 and the roller rotation axis L2. The drive frame 100 is disposed inside a rear wall of the lower housing 21. The drive frame 100 supports the development coupling 71, the development driving gear 70, the drum driving gear 61, a thrust member 62 described later (see FIG. 6), a drum cam gear 63 and a development cam gear 72. Besides, referring to FIGS. 8A, 8B and 8C, the drive frame 100 includes a drum supporting section 101 and a development supporting section 102 each formed as a circular opening.

The drum driving gear 61 is fit in the drum supporting section 101. Besides, the development driving gear 70 and the development coupling 71 described later are fit in the development supporting section 102. The drive frame 100 further includes a frame inclined portion 102A (corresponding to a second inclined portion). The frame inclined portion 102A is an inclined face disposed in an inner circumferential portion of the development supporting section 102 and inclined toward the axial direction of the roller rotation axis L2 in the circumferential direction around the roller rotation axis L2.

As illustrated in FIGS. 6 and 9, the drum driving gear 61 is a driving member for rotating the photoconductive drum 121 around the drum rotation axis L1. The drum driving gear 61 is provided coaxially with the drum rotation axis L1 to be connectable/separable to/from the photoconductive drum 121 in the axial direction of the drum rotation axis L1. In other words, the drum driving gear 61 is movable in the axial direction of the drum rotation axis L1. The drum driving gear 61 is rotated around the drum rotation axis L1 to transmit a rotating driving force to the photoconductive drum 121.

As illustrated in FIG. 6, the drum driving gear 61 is in such a shape that a drum coupling portion 611 is projected in the axial direction from the center of a disk-shaped body portion 612. In addition, a drum driving gear portion 610 is provided in an outer circumferential portion of the body portion 612. It is noted that the gear shape of the drum driving gear portion 610 is not illustrated in FIG. 6.

The drum driving gear portion 610 is a gear provided in the circumferential direction in the rotation of the drum driving gear 61. A driving shaft of a drum motor not shown is connected to the drum driving gear portion 610. As a result, the photoconductive drum 121 is rotated by the rotating driving force of the drum motor. The drum coupling portion 611 includes a coupling not shown inside thereof. The coupling is engaged with a flange not shown of the photoconductive drum 121, so as to transmit the rotating driving force from the drum driving gear 61 to the photoconductive drum 121.

As illustrated in FIGS. 7 and 8, the development driving gear 70 is rotatably supported in the development supporting portion 102 of the drive frame 100. The development driving gear 70 transmits a rotating driving force to the development roller 124A via the development coupling 71 described later. A development motor not shown is connected to the development driving gear 70. As a result, the development roller 124A is rotated by a rotating driving force of the development motor. The development driving gear 70 includes a development driving shaft 701 and a D surface 702.

The development driving shaft 701 is a shaft projected from the development driving gear 70 in the axial direction of the roller rotation axis L2 for rotating the development coupling 71. The development driving shaft 701 is inserted into a cylindrical portion of the development coupling 71. The D surface 702 is a portion formed by cutting out a part of the circumferential surface of the development driving shaft 701. Correspondingly to the D surface 702 of the development driving shaft 701, a space having a cross-section in the shape of the D surface is formed in the cylindrical portion of the development coupling 71. As a result, the development driving shaft 701 and the development coupling 71 are integrally rotated.

The development coupling 71 is a driving member for rotating the development roller 124A (see FIG. 10) around the roller rotation axis L2. The development coupling 71 is provided coaxially with the roller rotation axis L2 so as to be connectable/separable to/from the development roller 124A in the axial direction of the roller rotation axis L2. In other words, the development coupling 71 is movable in the axial direction of the roller rotation axis L2. The development coupling 71 is in a substantially cylindrical shape. Into the cylindrical portion of the development coupling 71, the development driving shaft 701 of the development driving gear 70 is inserted as described above.

On the other hand, the development coupling 71 has a development coupling portion 711 provided on the opposite side of the development driving gear 70. The development coupling portion 711 is a coupling formed by cutting out a part of the cylindrical portion of the development coupling 71. In association with the movement in the axial direction of the development coupling 71, the development coupling portion 711 is engaged with an engagement portion provided on a shaft not shown of the development roller 124A. As a result, the rotating driving force of the development driving gear 70 is transmitted via the development coupling 71 to the development roller 124A.

Referring to FIG. 3, the rack 50 is a plate-shaped member extending in an upper edge portion of the drive frame 100 along its upper edge. The rack 50 is movable in a first direction (illustrated with an arrow D1) and in a second direction (illustrated with an arrow D2) opposite to the first direction as illustrated in FIG. 3. In the present embodiment, the rack 50 is moved in the first direction or the second direction in conjunction with the opening/closing operation of the cover 21A.

Specifically, a connecting wire not shown is provided between the cover 21A and the rack 50. Thus, the rack 50 is moved in the first direction in conjunction with the opening operation of the cover 21A, and is moved in the second direction in conjunction with the closing operation of the cover 21A. The rack 50 includes a rack gear portion 50A (corresponding to a first gear portion). The rack gear portion 50A is a gear portion provided to extend in the first direction. The rack gear portion 50A is engaged with a drum cam gear portion 631 of the drum cam gear 63 described later.

The connection drive section 5A (see FIGS. 3 and 4) executes a separating operation for separating the drum driving gear 61 from the photoconductive drum 121 and a separating operation for separating the development coupling 71 from the development roller 124A in conjunction with the movement of the rack 50 in the first direction. Besides, the connection drive section 5A executes a connecting operation for connecting the drum driving gear 61 to the photoconductive drum 121 and a connecting operation for connecting the development coupling 71 to the development roller 124A in conjunction with the movement of the rack 50 in the second direction.

Moreover, in the present embodiment, the connection drive section 5A separates the drum driving gear 61 and the development coupling 71 respectively from the photoconductive drum 121 and the development roller 124A in such a manner as to cause a time difference between the separating operation for the drum driving gear 61 and the separating operation for the development coupling 71. Besides, the connection drive section 5A connects the drum driving gear 61 and the development coupling 71 respectively to the photoconductive drum 121 and the development roller 124A in such a manner as to cause a time difference between the connecting operation for the drum driving gear 61 and the connecting operation for the development coupling 71.

As illustrated in FIGS. 3, 6, 7, 9 and 10, the connection drive section 5A includes a first spring 6S (corresponding to a first urging member), a drum transmission section 61A (corresponding to a first transmission section), a second spring 7S (corresponding to a second urging member), a development transmission section 71A (corresponding to a second transmission section) and a connecting section 8.

As illustrated in FIG. 9, the first spring 6S urges the drum driving gear 61 toward the photoconductive drum 121, so as to connect the drum driving gear 61 to the photoconductive drum 121. The first spring 6S is a spring member provided between the drum driving gear 61 and an inner wall of the drive frame 100. An urging member for causing an urging force can be simply configured by employing a spring member.

As illustrated in FIG. 3, the drum transmission section 61A is engaged with the rack 50, so as to rotate in a third direction (illustrated with an arrow D3 in FIG. 3) around the drum rotation axis L1 in association with the movement of the rack 50 in the first direction. At this point, the drum transmission section 61A separates the drum driving gear 61 from the photoconductive drum 121 against the urging force of the first spring 6S. Besides, the drum transmission section 61A is rotated in a fifth direction (illustrated with an arrow D5 in FIG. 3) opposite to the third direction around the drum rotation axis L1 in association with the movement of the rack 50 in the second direction.

Referring to FIG. 6, the drum transmission section 61A includes the drum cam gear 63 (corresponding to a first transmission gear) and the thrust member 62. The drum cam gear 63 is rotatable around the drum rotation axis L1. The drum cam gear 63 is in a substantially cylindrical shape. The drum coupling portion 611 penetrating through the thrust member 62 described later is inserted into the cylindrical portion of the drum cam gear 63. The drum cam gear 63 includes a large diameter portion 630A and a small diameter portion 630B.

The large diameter portion 630A is disposed outside in the axial direction of the drum cam gear 63. The small diameter portion 630B is connected to the large diameter portion 630A in the axial direction and is disposed inside in the axial direction of the drum cam gear 63. The outer diameter of the small diameter portion 630B is set to be smaller than the outer diameter of the large diameter portion 630A. The drum cam gear 63 includes the drum cam gear portion 631 (corresponding to a second gear portion), a first fulcrum portion 632 and a pair of drum cam inclined portions 633 (corresponding to a first contact portion). It is noted that merely one of the pair of drum cam inclined portions 633 is illustrated in FIG. 6.

The drum cam gear portion 631 is a gear portion provided in an outer circumferential portion of the large diameter portion 630A of the drum cam gear 63. The drum cam gear portion 631 is provided, in the outer circumferential portion of the large diameter portion 630A, in a region corresponding to approximately 180 degrees in the circumferential direction. The drum cam gear portion 631 engages with the rack gear portion 50A of the rack 50. The first fulcrum portion 632 is provided in an outer circumferential portion of the drum transmission section 61A. Specifically, the first fulcrum portion 632 is provided in the vicinity of one end of the drum cam gear portion 631 in the circumferential direction of the drum cam gear 63. The first fulcrum portion 632 is a columnar fulcrum projecting from the outer circumferential portion of the large diameter portion 630A in the axial direction. The first fulcrum portion 632 projects from the large diameter portion 630A toward the drum driving gear 61. The first fulcrum portion 632 is inserted through a first supporting portion 801 of a linking member 80 described later.

The pair of drum cam inclined portions 633 are a pair of inclined faces formed in an outer circumferential portion of the large diameter portion 630A so as to oppose the thrust member 62 described later. Each of the drum cam inclined portions 633 is inclined toward the axial direction of the drum cam gear 63 in the circumferential direction of the drum cam gear 63. The pair of drum cam inclined portions 633 can be brought into contact respectively with a first thrust inclined portion 621 and a second thrust inclined portion 622 of the thrust member 62 described later.

The thrust member 62 is provided between the drum cam gear 63 and the drum driving gear 61 in the axial direction of the drum rotation axis L1. The thrust member 62 includes a pair of projections 623. Each of the projections 623 projects in the radial direction of the thrust member 62 in an end portion closer to the drum cam gear 63 on the outer circumferential surface of the thrust member 62. The pair of projections 623 oppose each other in the radial direction of the thrust member 62. As illustrated in FIG. 8A, a pair of engaging grooves 101A are formed on the inner circumferential surface of the drum supporting section 101 of the drive frame 100.

As illustrated in FIGS. 6 and 8B, with the thrust member 62 fit in the drum supporting section 101, the pair of projections 623 are engaged with the pair of engaging grooves 101A. Accordingly, the rotation of the thrust member 62 around the drum rotation axis L1 is regulated. The thrust member 62 is moved in the axial direction of the drum rotation axis L1 in association with the rotation in the third direction of the drum cam gear 63. At this point, the thrust member 62 pushes the drum driving gear 61 in a direction away from the photoconductive drum 121.

Referring to FIG. 6, the thrust member 62 is in a substantially cylindrical shape. The thrust member 62 is fit on the outer circumference of the drum coupling portion 611 of the drum driving gear 61. As a result, the drum coupling portion 611 penetrates through the cylindrical portion of the thrust member 62. The thrust member 62 includes the first thrust inclined portion 621 and the second thrust inclined portion 622 (both corresponding to a first inclined portion). Each of the first thrust inclined portion 621 and the second thrust inclined portion 622 is inclined toward the axial direction of the drum rotation axis L1 in the circumferential direction around the drum rotation axis L1.

The first thrust inclined portion 621 and the second thrust inclined portion 622 are provided to oppose each other in the radial direction of the thrust member 62. Each of the first thrust inclined portion 621 and the second thrust inclined portion 622 is formed by cutting out a part of the outer circumference of the thrust member 62.

The pair of drum cam inclined portions 633 of the drum cam gear 63 are brought into contact with the first thrust inclined portion 621 and the second thrust inclined portion 622. Then, in association with the rotation in the third direction of the drum cam gear 63, the pair of drum cam inclined portions 633 respectively push the first thrust inclined portion 621 and the second thrust inclined portion 622, so that the thrust member 62 can move in the axial direction of the drum rotation axis L1. At this point, the thrust member 62 pushes a pushed portion 61T (see FIG. 6) of the drum driving gear 61 in the axial direction, so that the drum coupling portion 611 of the drum driving gear 61 can be separated from the flange not shown of the photoconductive drum 121.

As illustrated in FIG. 10, the second spring 7S urges the development coupling 71 toward the development roller 124A, so as to connect the development coupling 71 and the development roller 124A to each other. The second spring 7S is a spring member provided between the development coupling 71 and the development driving gear 70. An urging member for causing an urging force can be simply configured by employing a spring member. Incidentally, the second spring 7S and the first spring 6S cause urging forces respectively necessary for connecting the development coupling 71 to the development roller 124A and connecting the drum driving gear 61 to the photoconductive drum 121. Therefore, in the present embodiment, for opening the cover 21A, namely, for moving the rack 50, operating forces against the urging forces of the first spring 6S and the second spring 7S are necessary.

As illustrated in FIGS. 3 and 7, the development transmission section 71A is rotated in a fourth direction (illustrated with an arrow D4 in FIG. 3) around the roller rotation axis L2 in association with the rotation of the drum cam gear 63 in the third direction. At this point, the development transmission section 71A separates the development coupling 71 from the development roller 124A against the urging force of the second spring 7S. On the other hand, the development transmission section 71A is rotated in a sixth direction (illustrated with an arrow D6 in FIG. 3) around the roller rotation axis L2 in association with the rotation of the drum cam gear 63 in the fifth direction. In the present embodiment, the development transmission section 71A is configured by a development cam gear 72 (corresponding to a second transmission gear).

The drive frame 100 supports the development cam gear 72 rotatably around the roller rotation axis L2. Accordingly, the development cam gear 72 is rotatable around the roller rotation axis L2. The development cam gear 72 is moved in the axial direction of the roller rotation axis L2 in association with the rotation in the fourth direction (illustrated with the arrow D4 in FIG. 3). At this point, the development cam gear 72 pushes the development coupling 71 in a direction away from the development roller 124A.

Referring to FIG. 7, the development cam gear 72 is in a substantially cylindrical shape. The development coupling portion 711 of the development coupling 71 is inserted into the cylindrical portion of the development cam gear 72. After penetrating through the development cam gear 72, the development coupling portion 711 is exposed outside in the axial direction beyond the development cam gear 72, so that the development coupling portion 711 can be engaged with the shaft not shown of the development roller 124A. The development cam gear 72 includes an extending portion 722, a second fulcrum portion 723 and a development cam inclined portion 724 (corresponding to a second contact portion).

The extending portion 722 is a plate-shaped member extending from an outer circumferential portion of the development cam gear 72 in the radial direction of the development cam gear 72. The extending portion 722 is provided on a side closer to the development driving gear 70 in the axial direction of the development cam gear 72. Besides, the extending portion 722 is in a substantially triangular shape on a cross-section crossing the roller rotation axis L2. The second fulcrum portion 723 is provided in an outer circumferential portion of the development transmission section 71A (or the development cam gear 72). Specifically, the second fulcrum portion 723 is disposed at the tip of the extending portion 722. The second fulcrum portion 723 is a columnar fulcrum projecting from the extending portion 722 in the axial direction of the development cam gear 72. The second fulcrum portion 723 extends from the extending portion 722 outward in the axial direction of the development cam gear 72 (i.e., toward the development roller 124A). The second fulcrum portion 723 is inserted through a second supporting portion 802 of the linking member 80 described later.

The development cam inclined portion 724 is provided in a region opposing the extending portion 722 in the outer circumferential portion of the development cam gear 72. The development cam inclined portion 724 is inclined toward the axial direction of the development cam gear 72 in the circumferential direction of the development cam gear 72. In other words, the development cam inclined portion 724 is inclined toward the axial direction of the roller rotation axis L2 in the circumferential direction around the roller rotation axis L2. When the development cam inclined portion 724 is mounted on the drive frame 100, the development cam inclined portion 724 opposes the frame inclined portion 102A of the drive frame 100. Then, the development cam inclined portion 724 is pushed by the frame inclined portion 102A in association with the rotation of the development cam gear 72 in the fourth direction. As a result, the development cam gear 72 is moved in the axial direction of the roller rotation axis L2.

As illustrated in FIGS. 3, 6 and 7, the connecting section 8 connects the drum transmission section 61A and the development transmission section 71A to each other, and rotates the development transmission section 71A in the fourth direction in association with the rotation of the drum transmission section 61A in the third direction. Besides, the connecting section 8 rotates the development transmission section 71A in the sixth direction in association with the rotation of the drum transmission section 61A in the fifth direction.

Figure 15:
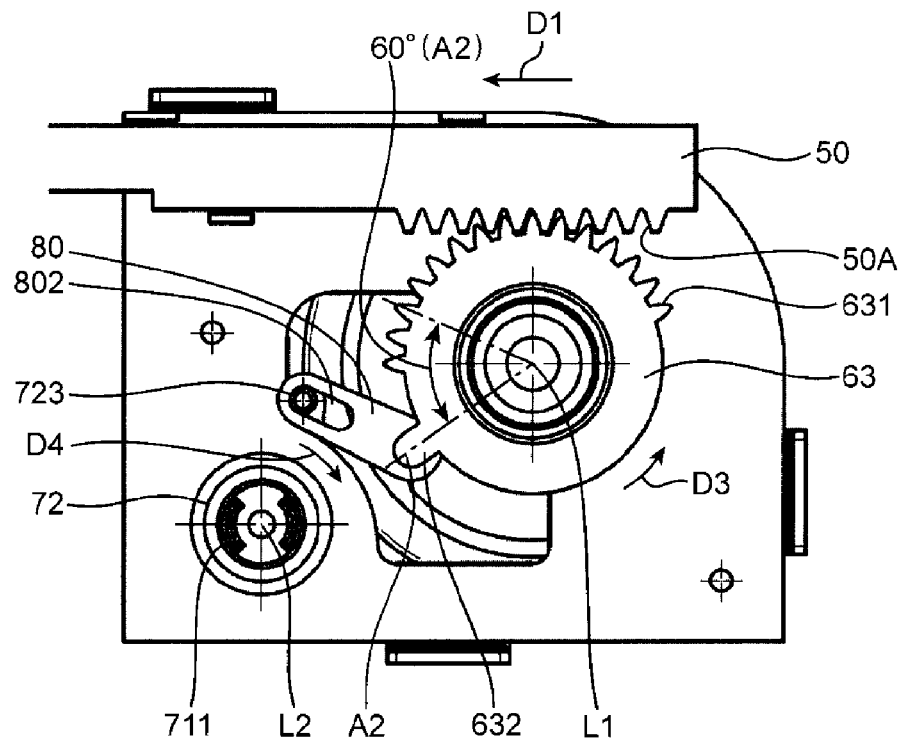
FIG. 15 is a front view of the driving force transmission device of the embodiment obtained when the drum cam gear is rotated by an angle of 60 degrees.
Figure 16:
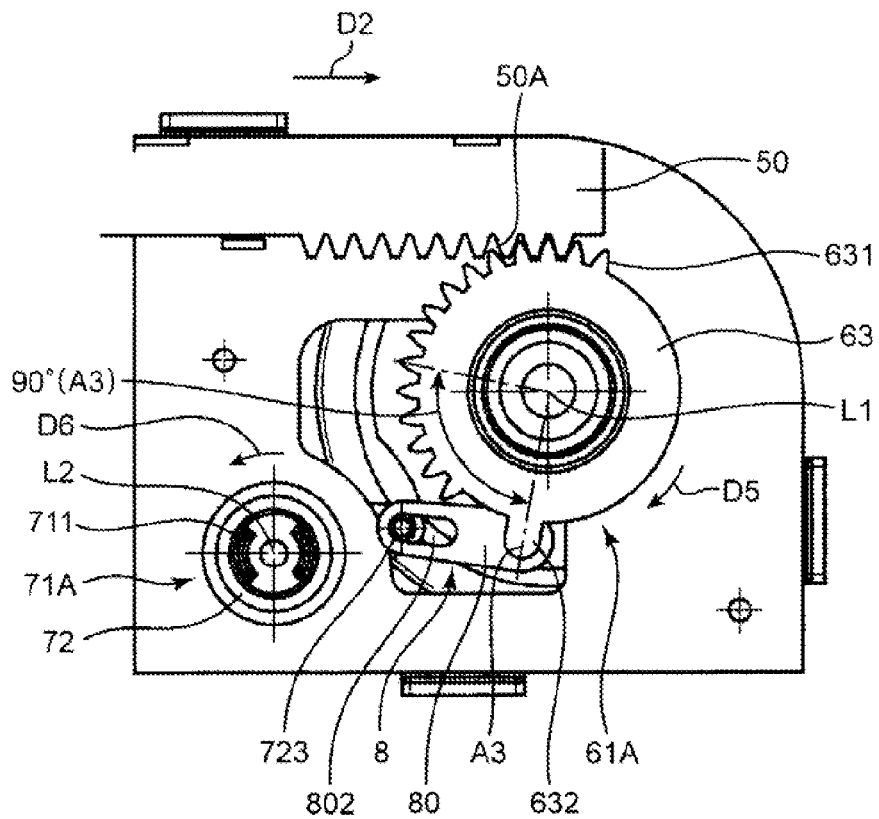
FIG. 16 is a front view of the driving force transmission device of the embodiment obtained when the drum cam gear is rotated by an angle of 90 degrees.

Incidentally, during the rotation in the third direction, the drum cam gear 63 of the drum transmission section 61A rotates from a first angle A1 (of 0 degree) (see FIG. 11) through a second angle A2 (of 60 degrees) (see FIG. 15) to a third angle A3 (of 90 degrees) (see FIG. 16). The first angle A1 corresponds to an angle at which the drum driving gear 61 is connected to the photoconductive drum 121. The second angle A2 corresponds to an angle at which the drum driving gear 61 is separated from the photoconductive drum 121.

The connecting section 8 regulates the rotation around the roller rotation axis L2 of the development cam gear 72 of the development transmission section 71A in association with the rotation of the drum cam gear 63 of the drum transmission section 61A from the first angle A1 to the second angle A2. Besides, the connecting section 8 allows the rotation around the roller rotation axis L2 of the development cam gear 72 of the development transmission section 71A in association with the rotation of the drum cam gear 63 of the drum transmission section 61A from the second angle A2 to the third angle A3.

The connecting section 8 includes, in addition to the first fulcrum portion 632 and the second fulcrum portion 723, the linking member 80.

The linking member 80 is a linking member hung between the drum cam gear 63 and the development cam gear 72. The linking member 80 includes the first supporting portion 801 and the second supporting portion 802. The first supporting portion 801 is a circular opening formed near one end of the linking member 80. Through the first supporting portion 801, the first fulcrum portion 632 is inserted. As a result, the first supporting portion 801 rotatably supports the first fulcrum 632.

The second supporting portion 802 is an elongated opening formed near the other end of the linking member 80. In other words, the second supporting portion 802 is formed as a hole elongated in the direction crossing the roller rotation axis L2. Through the second supporting portion 802, the second fulcrum 723 is inserted. As a result, the second supporting portion 802 supports the second fulcrum 723, and in addition, the second fulcrum 723 is movable within the second supporting portion 802 in the lengthwise direction of the elongated opening.

Figure 18:
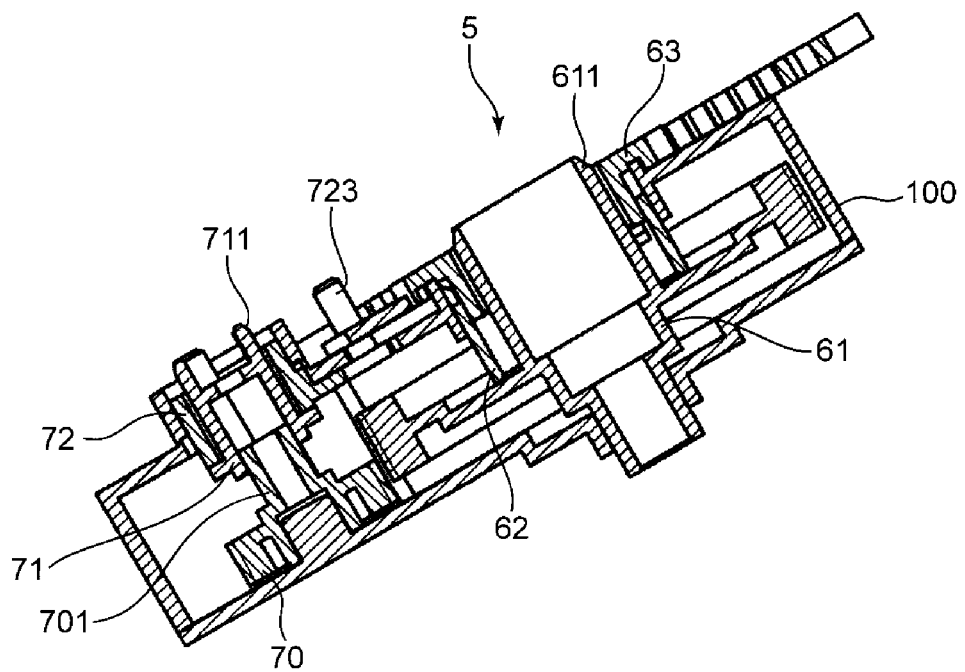
FIG. 18 is a cross-sectional view of the driving force transmission device of the embodiment obtained when the drum cam gear is rotated by the angle of 60 degrees.
Figure 19:
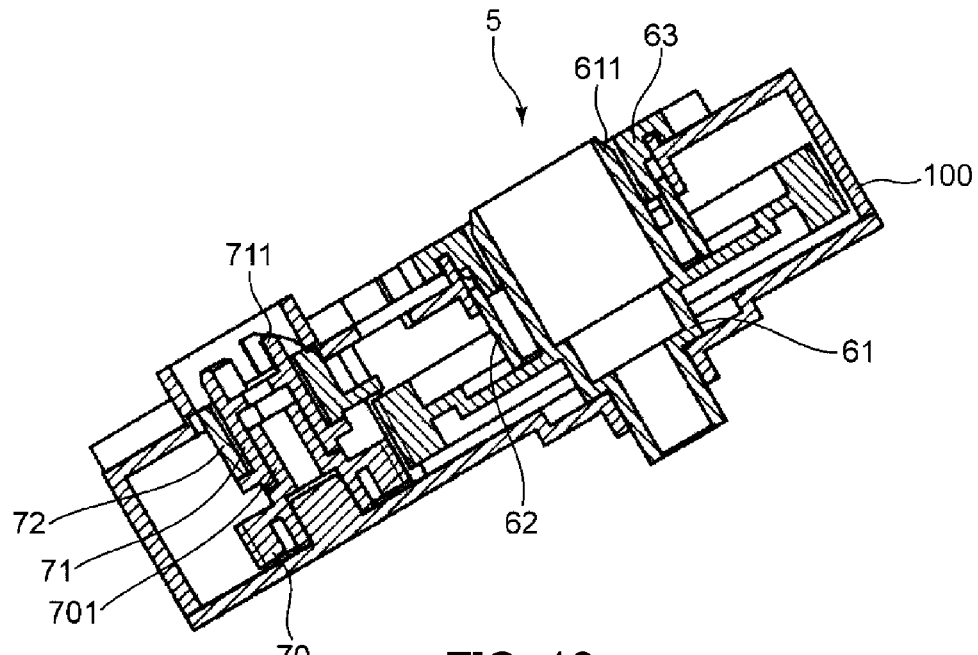
FIG. 19 is a cross-sectional view of the driving force transmission device of the embodiment obtained when the drum cam gear is rotated by the angle of 90 degrees.

Next, referring to FIGS. 11 to 19, the operation of the driving force transmission device 5 of the present embodiment will be described. FIGS. 11 to 16 are front views of the driving force transmission device 5 obtained when the drum cam gear 63 is rotated respectively by angles of 0 degree, 10 degrees, 20 degrees, 30 degrees, 60 degrees and 90 degrees. Also, FIGS. 17 to 19 are cross-sectional views of the driving force transmission device 5 obtained when the drum cam gear 63 is rotated respectively by the angles of 0 degree, 60 degrees and 90 degrees.

Figure 11:
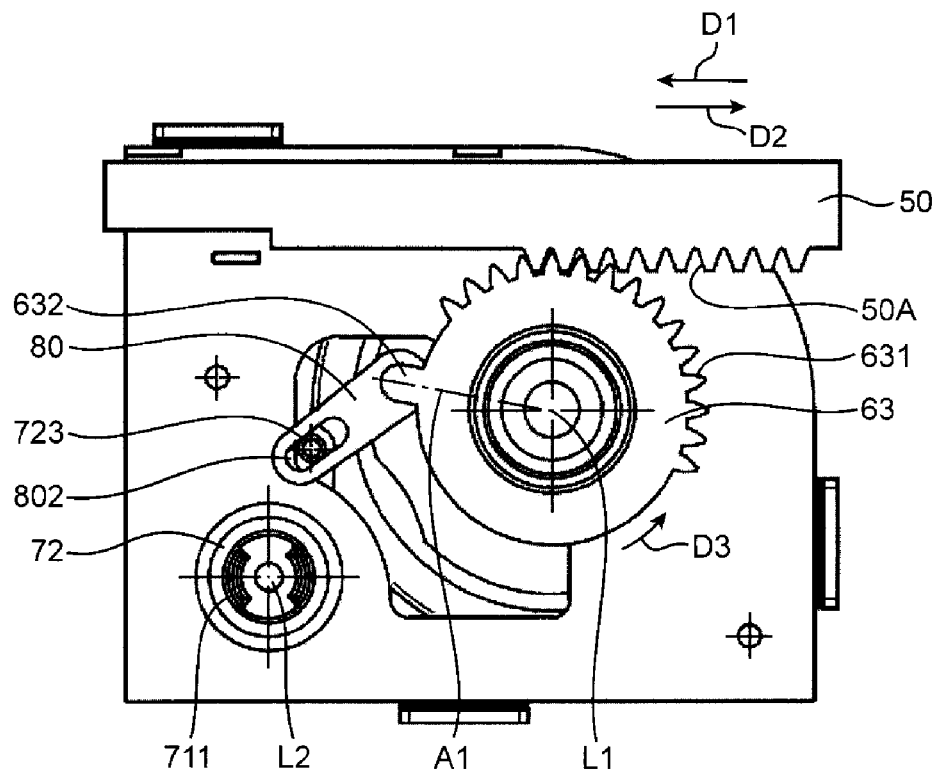
FIG. 11 is a front view of the driving force transmission device of the embodiment obtained when a drum cam gear is rotated by an angle of 0 degree.

Incidentally, the angle of the drum cam gear 63 illustrated in FIG. 11 (i.e., 0 degree) is defined as the first angle A1, that illustrated in FIG. 15 (i.e., 60 degrees) is defined as the second angle A2, and that illustrated in FIG. 16 (i.e., 90 degrees) is defined as the third angle A3. The first angle A1 corresponds to an angle at which the drum driving gear 61 and the development coupling 71 are respectively connected to the photoconductive drum 121 and the development roller 124A. The second angle A2 corresponds to an angle at which the drum driving gear 61 is separated from the photoconductive drum 121 and the development coupling 71 is started to separate from the development roller 124A. The third angle A3 corresponds to an angle at which the drum driving gear 61 is separated from the photoconductive drum 121 and the development coupling 71 is separated from the development roller 124A. It is noted that the rotation angles illustrated in FIGS. 11, 15 and 16 of the drum cam gear 63 are on the basis of the position of the first fulcrum portion 632.

Figure 17:
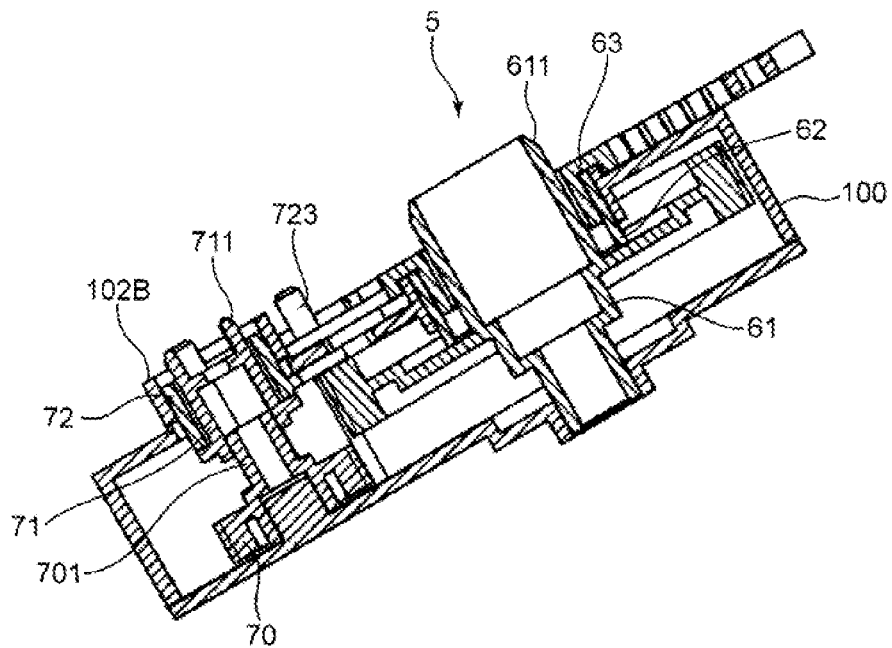
FIG. 17 is a cross-sectional view of the driving force transmission device of the embodiment obtained when the drum cam gear is rotated by the angle of 0 degree.

The state illustrated in FIGS. 11 and 17 corresponds to a state where the lower housing 21 of the image forming apparatus 1 is closed by the cover 21A. In this case, the rack 50 is disposed in an end position in the second direction (illustrated with the arrow D2), as shown in FIG. 11. Besides, a gear tooth of the rack gear portion 50A disposed in an end position in the first direction (illustrated with the arrow D1) is engaged with the drum cam gear portion 631 of the drum cam gear 63.

On the other hand, referring to FIG. 17, the drum driving gear 61 is urged toward the photoconductive drum 121 by the urging force of the first spring S6 (see FIG. 9). Here, the tip of the drum coupling portion 611 is exposed outside in the axial direction beyond the drum cam gear 63 to be connected to the flange not shown of the photoconductive drum 121. Accordingly, the driving force transmission device is placed in a state where a rotating driving force is transmitted from the drum driving gear 61 to the photoconductive drum 121.

Similarly, the development coupling 71 is urged toward the development roller 124A by the urging force of the second spring 7S (see FIG. 10). The tip of the development coupling portion 711 is exposed outside in the axial direction beyond an end 102B of the development supporting section 102 to be connected to the shaft not shown of the development roller 124A. Accordingly, the driving force transmission device is placed in a state where a rotating driving force is transmitted from the development driving gear 70 via the development coupling 71 to the development roller 124A.

When an operator of the image forming apparatus 1 starts to open the cover 21A (see FIG. 1), the rack 50 connected to the cover 21A is moved in the direction of the arrow D1 of FIG. 11. At this point, the drum cam gear 63 starts to rotate in the direction of the arrow D3 of FIG. 11 (i.e., the third direction) due to the engagement between the rack gear portion 50A of the rack 50 and the drum cam gear portion 631 of the drum cam gear 63. The rotation angle of the drum cam gear 63 is changed from the first angle A1 (of 0 degree) of FIG. 11 to the second angle A2 (of 60 degrees) of FIG. 15 through the movement of the rack 50.

Figure 12:
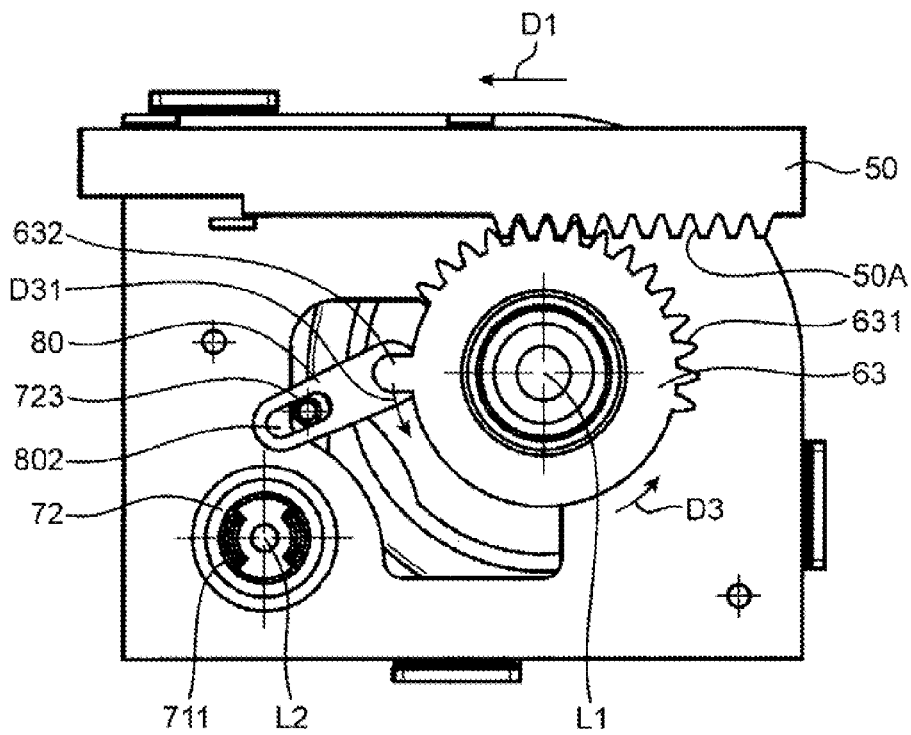
FIG. 12 is a front view of the driving force transmission device of the embodiment obtained when the drum cam gear is rotated by an angle of 10 degrees.
Figure 13:
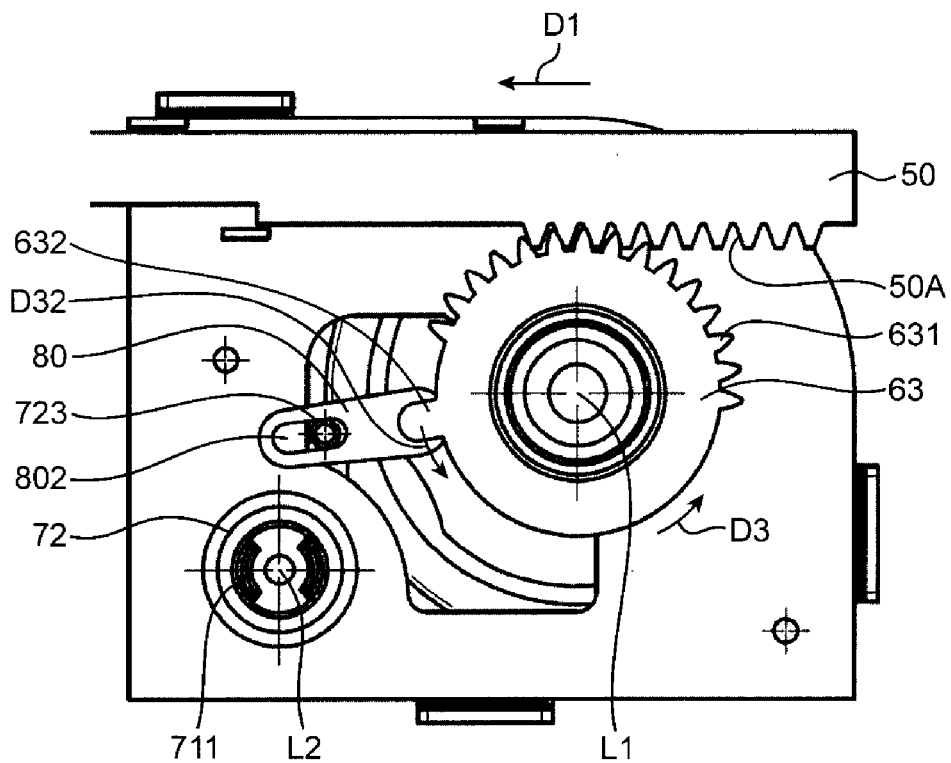
FIG. 13 is a front view of the driving force transmission device of the embodiment obtained when the drum cam gear is rotated by an angle of 20 degrees.
Figure 14:
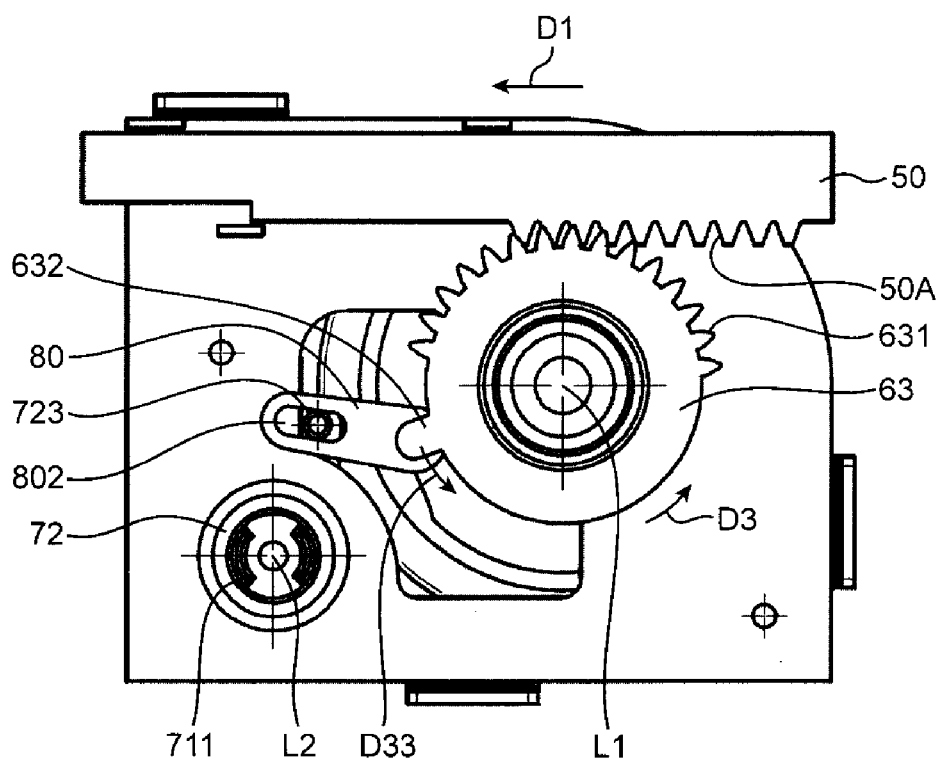
FIG. 14 is a front view of the driving force transmission device of the embodiment obtained when the drum cam gear is rotated by an angle of 30 degrees.

While the rotation angle is changing from the first angle A1 to the second angle A2, the first fulcrum portion 632 of the drum cam gear 63 moves the linking member 80 as illustrated with an arrow D31 of FIG. 12, an arrow D32 of FIG. 13 and an arrow D33 of FIG. 14. Here, the linking member 80 is moved in the direction illustrated with the arrows D31 to D33 while rotating around the first fulcrum portion 632.

As illustrated in FIGS. 11 to 15, however, while moving the linking member 80, the second fulcrum portion 723 of the development cam gear 72 moves within the elongated opening of the second supporting portion 802 of the linking member 80. In other words, with the second fulcrum portion 723 inserted through the elongated opening of the second supporting portion 802 of the linking member 80, the second fulcrum portion 723 itself does not move.

While the drum cam gear 63 is rotated from the state of FIG. 11 to the state of FIG. 15 as described above, the pair of drum cam inclined portions 633 of the drum cam gear 63 (see FIG. 6) come into contact with the first thrust inclined portion 621 and the second thrust inclined portion 622 of the thrust member 62. Then, owing to the inclination of the pair of drum cam inclined portions 633, the first thrust inclined portion 621 and the second thrust inclined portion 622, the thrust member 62 is moved in the axial direction of the drum rotation axis L1 in the direction away from the photoconductive drum 121. At the same time, the thrust member 62 pushes the drum driving gear 61 in the direction away from the photoconductive drum 121. As a result, the drum coupling portion 611 of the drum driving gear 61 is separated from the flange not shown of the photoconductive drum 121, so as to release the connection between the drum coupling portion 611 and the photoconductive drum 121 (see FIG. 18).

On the other hand, while the drum cam gear 63 is rotating from the first angle A1 to the second angle A2, the second fulcrum portion 723 does not move as described above, and hence, the rotating force of the drum cam gear 63 is not transmitted to the development cam gear 72. Accordingly, as illustrated in FIG. 18, in the state where the drum cam gear 63 is positioned at the second angle A2, the development coupling 71 is still in a state connected to the development roller 124A. Incidentally, in the state where the drum cam gear 63 is positioned at the second angle A2 illustrated in FIG. 15, the second fulcrum portion 723 has reached an end, out of the two ends of the elongated opening of the second supporting portion 802, opposite to the first fulcrum portion 632.

In this manner, in the present embodiment, in association with the rotation of the drum cam gear 63 of the drum transmission section 61A from the first angle A1 to the second angle A2, the linking member 80 is rotated around the first fulcrum portion 632 while the first fulcrum portion 632 is rotating in the third direction. Besides, the second fulcrum portion 723 moves within the elongated opening of the second supporting portion 802. As a result, the transmission of the rotating force of the drum cam gear 63 to the development cam gear 72 is regulated.

When the drum cam gear 63 is further rotated from the second angle A2 of FIG. 15 in the third direction (of the arrow D3), the first fulcrum portion 632 moves the linking member 80 in the third direction. At this point, since the second fulcrum portion 723 has reached the end of the elongated opening of the second supporting portion 802 as described above, the movement of the linking member 80 is converted via the second fulcrum portion 723 into the rotation of the development cam gear 72 in the fourth direction (of the arrow D4 of FIG. 15).

When the development cam gear 72 is rotated around the roller rotation axis L2 in the fourth direction, the frame inclined portion 102A (see FIGS. 8A and 8C) of the development supporting section 102 of the drive frame 100 comes into contact with the development cam inclined portion 724 (see FIG. 7) of the development cam gear 72. As a result, owing to the inclination of the frame inclined portion 102A and the development cam inclined portion 724, the development cam gear 72 is moved in the axial direction of the roller rotation axis L2.

Then, owing to the movement of the development cam gear 72, a collar 71T (see FIG. 7) of the development coupling 71 is pushed, so as to separate the development coupling portion 711 from the shaft not shown of the development roller 124A. Accordingly, the connection between the development coupling portion 711 and the development roller 124A is released, and the development coupling 71 is disposed in a position illustrated in FIG. 19. In this manner, after the drum cam gear 63 of the drum transmission section 61A is rotated by a specified angle (that is, 60 degrees in the present embodiment), namely, after time corresponding to rotation by the specified angle of the drum cam gear 63 has elapsed, the rotation of the development cam gear 72 of the development transmission section 71A can be started. As a result, a suitable time difference can be provided between the separating operation for the drum driving gear 61 and the separating operation for the development coupling 71. Incidentally, the length of the time difference can be set in accordance with the longitudinal size of the elongated opening of the second supporting portion 802. Accordingly, the length of the time difference can be easily set by controlling the longitudinal size of the elongated opening of the second supporting portion 802.

In particular, the drum cam gear 63 and the thrust member 62 together realize the separating operation for the drum driving gear 61. Besides, the development cam gear 72 corresponding to the development transmission section 71A realizes the separating operation for the development coupling 71. Incidentally, while the drum cam gear 63 is rotated from the second angle A2 to the third angle A3, the thrust member 62 is not moved in the axial direction but rotated in its circumferential direction.

When the connection between the drum driving gear 61 and the photoconductive drum 121 and the connection between the development coupling 71 and the development roller 124A are released by the movement of the rack 50 and the rotation of the drum cam gear 63, an operator can safely detach the photoconductive drum 121 and the developing unit 124 (including the development roller 124A) out of the lower housing 21. Incidentally, if the photoconductive drum 121 and the developing unit 124 are attached/detached to/from the lower housing 21 in a direction crossing the drum rotation axis L1 and the roller rotation axis L2 in another embodiment, the drum driving gear 61 and the development coupling 71 may disturb the attaching/detaching operation in some cases. Accordingly, in such cases, the separating operations for the drum driving gear 61 and the development coupling 71 make the attaching/detaching operation realized more safely.

When a user or a maintenance person of the image forming apparatus 1 has completed exchange of the photoconductive drum 121 and the developing unit 124, the cover 21A is closed again. Here, the rack 50 is moved in the direction of the arrow D2 as illustrated in FIG. 16. Then, the rack gear portion 50A of the rack 50 and the drum cam gear portion 631 of the drum cam gear 63 are engaged with each other, so as to rotate the drum cam gear 63 in the direction of the arrow D5 of FIG. 16 (i.e., in the fifth direction).

While the drum cam gear 63 of the drum transmission section 61A is rotating in the fifth direction from the third angle A3 (of 90 degrees) to the second angle A2 (of 60 degrees), the connecting section 8 rotates the development cam gear 72 of the development transmission section 71A around the roller rotation axis L2 in the sixth direction (illustrated with the arrow D6 in FIG. 16) opposite to the fourth direction. As a result, the development cam gear 72 is moved by the second spring 7S in the axial direction of the roller rotation axis L2 to come close to the development roller 124A. Then, as illustrated in FIG. 18, the development coupling 71 is disposed again in the position connected to the development roller 124A by the urging force of the second spring 7S.

When the drum cam gear 63 is further rotated in association with the movement of the rack 50 in the second direction, in association with the rotation of the drum cam gear 63 of the drum transmission section 61A from the second angle A2 (of 60 degrees) to the first angle A1 (of 0 degree), the thrust member 62 is moved by the first spring 6S in the axial direction to come close to the photoconductive drum 121. Then, the drum driving gear 61 is connected again to the photoconductive drum 121 by the urging force of the first spring 6S. Accordingly, when the cover 21A is closed, the driving forces are stably transmitted to the photoconductive drum 121 and the development roller 124A.

As described so far, in the present embodiment, the time difference can be provided between the connecting operation for the drum driving gear 61 and the connecting operation for the development coupling 71. Besides, the connecting operations for the drum driving gear 61 and the development coupling 71 can be executed in the reverse order to the separating operations for the drum driving gear 61 and the development coupling 71.

Figure 20:
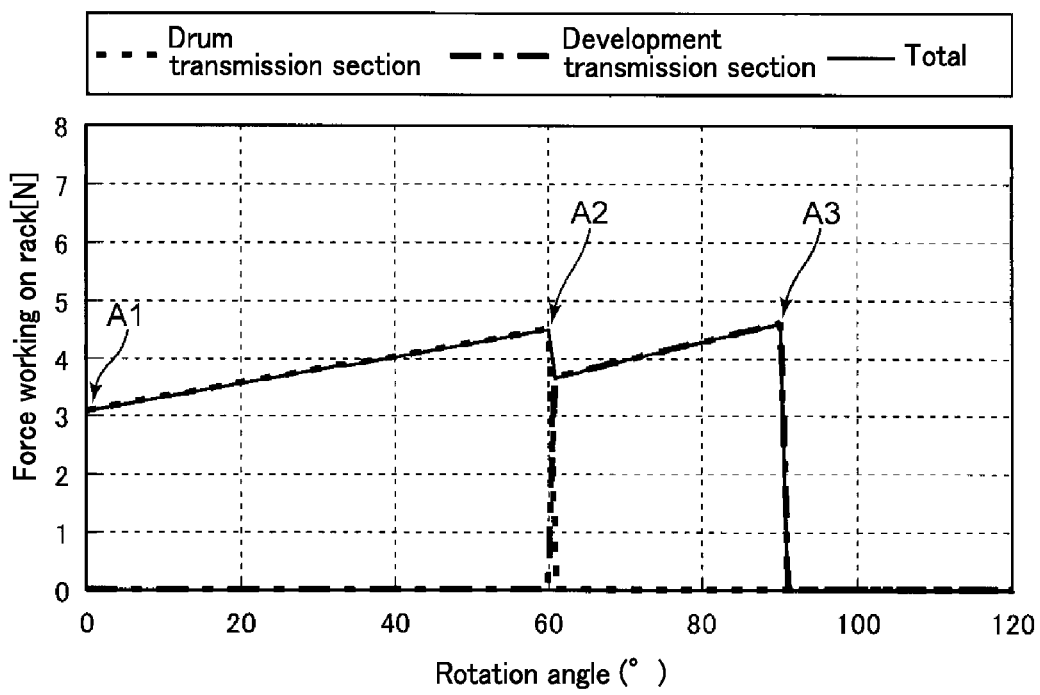
FIG. 20 is a graph of a force working on a moving member in association with a separating operation for a driving member in the driving force transmission device of the embodiment.

FIG. 20 is a graph illustrating the relationship, obtained in the driving force transmission device 5 of the present embodiment, between the rotation angle (indicated by the horizontal axis) of the drum cam gear 63 in association with the movement of the rack 50 and the force (load) (indicated by the vertical axis) working on the rack 50. It is noted that strokes of the drum driving gear 61 and the development coupling 71 in the axial direction are 4.5 mm and 4 mm, respectively. Besides, the urging forces of the first spring 6S and the second spring 7S are 5N and 3N, respectively. The coefficient of friction obtained in the movement in the axial direction of the drum driving gear 61 and the development coupling 71 is 0.3.

Figure 21:
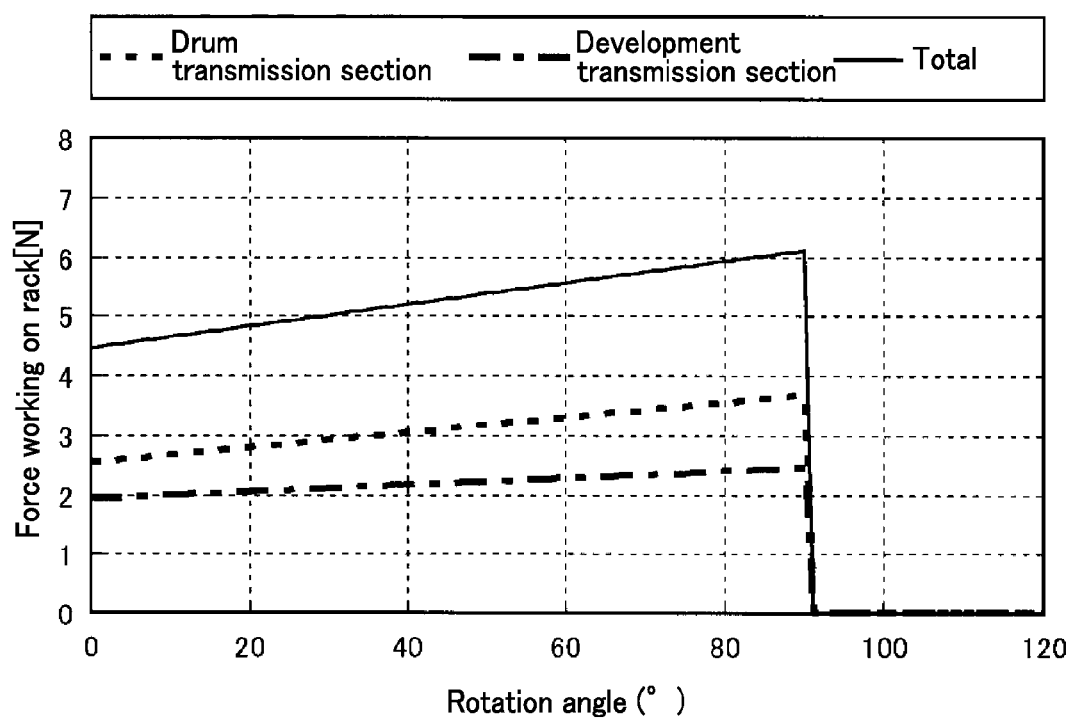
FIG. 21 is a graph of a force working on a moving member in association with a separating operation of a driving member in a general driving force transmission device to be compared with the driving force transmission device of the embodiment.

Furthermore, FIG. 21 is a graph illustrating the relationship, obtained in a general driving force transmission device to be compared with the driving force transmission device 5 of the present embodiment, between the rotation angle and the force working on a rack. It is noted that a drum driving gear and a development coupling are simultaneously separated respectively from a photoconductive drum and a development roller in association with the movement of the rack not shown in the general driving force transmission device.

Referring to FIG. 20, in the driving force transmission device 5 of the present embodiment, the drum driving gear 61 is separated from the photoconductive drum 121 while the rotation angle of the drum cam gear 63 is changed from the first angle A1 to the second angle A2 as described above. On the other hand, the development coupling 71 is separated from the development roller 124A while the rotation angle of the drum cam gear 63 is changed from the second angle A2 to the third angle A3.

In other words, the connection drive section 5A provides a time difference between the separating operation for separating the drum driving gear 61 from the photoconductive drum 121 and the separating operation for separating the development coupling 71 from the development roller 124A. As a result, simultaneous occurrence of a load caused by the separating operation for the drum driving gear 61 and a load caused by the separating operation for the development coupling 71 can be suppressed as much as possible. Therefore, a load caused in moving the rack 50 can be suppressed, so that a load necessary for the separating operations for a plurality of driving members (that is, the drum driving gear 61 and the development coupling 71) can be suitably reduced.

In the present embodiment, as shown in FIG. 20, the total force working on the rack 50 in the separating operations for the drum driving gear 61 (i.e., the drum transmission section 61A) and the development coupling 71 (i.e., the development transmission section 71A) is 4.6 N at most.

On the other hand, referring to FIG. 21, since the drum driving gear and the development coupling are respectively separated simultaneously from the photoconductive drum and the development roller in association with the movement of the rack not shown in the general driving force transmission device, a load of 6.1 N at most is applied. As a result, a large operating force is necessary for opening a cover connected to the rack (corresponding to the cover 21A of the present embodiment). In other words, the operating force necessary for opening the cover 21A is suitably reduced in the present embodiment.

The driving force transmission device 5 and the image forming apparatus 1 including the same according to the embodiment of the present disclosure have been described so far, but the present disclosure is not limited to the above description but can be practiced with modifications, for example, made as follows:

(1) In the above-described embodiment, the movement of the rack 50 in the first direction and the second direction is in conjunction with the opening/closing operation of the cover 21A, which does not limit the present disclosure. The rack 50 may be moved in the first direction and the second direction in conjunction with rotational movement of a lever member not shown provided within the cover 21A. Alternatively, the rack 50 itself may be directly moved by an operator.

(2) In the above-described embodiment, the drum driving gear 61 for transmitting the driving force to the photoconductive drum 121 is provided between the rack 50 and the linking member 80 so as to transmit the rotating force from the drum cam gear 63 via the linking member 80 to the development coupling 71, which does not limit the present disclosure. The positions of the drum driving gear 61 and the development coupling 71 may be opposite to those illustrated in FIG. 4. In addition, the development coupling 71 may transmit the driving force not to the development roller 124A but to a screw member not shown provided in the developing unit 124. Besides, the first rotating member and the second rotating member may be rotating bodies other than the photoconductive drum 121 and the development roller 124A.

(3) In the above-described embodiment, the thrust member 62 and the drum cam gear 63 are provided as the drum transmission section 61A and the development cam gear 72 is provided as the development transmission section 71A, which does not limit the present disclosure. Specifically, as the drum transmission section 61A, the drum cam gear 63 may directly separate the drum driving gear 61 from the photoconductive drum 121, or the development transmission section 71A may include a member corresponding to the thrust member 62 of the drum transmission section 61A.

What is claimed is:

1. A driving force transmission device, comprising:
   a first driving member configured to rotate a first rotating member around a first rotation axis, provided coaxially with the first rotation axis, and connectable to the first rotating member and separable from the first rotating member in an axial direction of the first rotation axis;
   a second driving member configured to rotate a second rotating member around a second rotation axis parallel to the first rotation axis, provided coaxially with the second rotation axis, and connectable to the second rotating member and separable from the second rotating member in an axial direction of the second rotation axis;
   a moving member movable in a first direction perpendicular to the first rotational axis and the second rotational axis and a second direction opposite to the first direction; and
   a connection drive section configured to execute, in conjunction with movement of the moving member in the first direction, a separating operation for separating the first driving member from the first rotating member and a separating operation for separating the second driving member from the second rotating member,
   wherein the moving member includes a first gear portion extending in the first direction,
   the connection drive section includes:
      a first urging member configured to urge the first driving member toward the first rotating member so as to connect the first driving member to the first rotating member;
      a first transmission section configured to separate the first driving member from the first rotating member;
      a second urging member configured to urge the second driving member toward the second rotating member so as to connect the second driving member to the second rotating member;
      a second transmission section configured to separate the second driving member from the second rotating member; and
      a connecting section configured to connect the first transmission section and the second transmission section to each other,
   the first transmission section includes a first transmission gear including a second gear portion,
   the second gear portion engages with the first gear portion of the moving member,
   the first transmission gear rotates in a third direction around the first rotation axis in association with the movement of the moving member in the first direction,
   the first transmission section separates the first driving member from the first rotating member in association with the rotation of the first transmission gear in the third direction,
   the second transmission section includes a second transmission gear, the second transmission gear rotates around the second rotation axis in a fourth direction in association with the rotation of the first transmission gear in the third direction so as to separate the second driving member from the second rotating member, the fourth direction is opposite to the third direction, the connecting section rotates the second transmission gear in the fourth direction in association with the rotation of the first transmission gear in the third direction, the connecting section includes:
- a first fulcrum portion provided in the first transmission gear;
- a second fulcrum portion provided in the second transmission gear; and
- a linking member hung between the first fulcrum portion and the second fulcrum portion, the linking member includes:
- a first supporting portion configured to support the first fulcrum portion; and
- a second supporting portion configured to support the second fulcrum portion and having an elongated opening extending in a direction crossing the second rotation axis, the second fulcrum portion is inserted through the elongated opening, in the first transmission section, the first transmission gear is rotated in the third direction by the moving member from a first angle at which the first driving member is connected to the first rotating member to a third angle through a second angle at which the first driving member is separated from the first rotating member, in the connecting section:
- the first fulcrum portion moves the linking member in association with the rotation of the first transmission gear from the first angle to the second angle;
- while the first transmission gear is rotating from the first angle to the second angle, the second supporting portion moves so as the second fulcrum portion approaches a first end of the elongated opening in a longitudinal direction thereof and then moves so as the second fulcrum portion contacts with a second end of the elongated opening in the longitudinal direction;
- the first end is an end closest to the first supporting portion among a pair of ends of the elongated opening in the longitudinal direction; and
- the second end is an end furthest from the first supporting portion among the pair of ends of the elongated opening in the longitudinal direction, the second transmission gear rotates in the fourth direction around the second rotation axis in association with the rotation of the first transmission gear from the second angle to the third angle so as to separate the second driving member from the second rotating member, and a time difference occurs between the separating operation for the first driving member and the separating operation for the second driving member.

2. A driving force transmission device according to claim 1,
wherein the first transmission section includes
a thrust member provided between the first transmission gear and the first driving member in the axial direction of the first rotation axis,
the thrust member is moved in the axial direction of the first rotation axis in association with rotation of the first transmission gear in the third direction so as to push the first driving member in a direction away from the first rotating member, and
the second transmission gear is moved in the axial direction of the second rotation axis in association with rotation thereof in the fourth direction so as to push the second driving member in a direction away from the second rotating member.

3. A driving force transmission device according to claim 2,
wherein the first transmission gear further includes a first contact portion provided to oppose the thrust member,
the thrust member includes a first inclined portion inclined toward the axial direction of the first rotation axis in a circumferential direction around the first rotation axis, and
the first contact portion pushes the first inclined portion in association with the rotation of the first transmission gear in the third direction.

4. A driving force transmission device according to claim 2, further comprising a frame configured to support the second transmission gear rotatably around the second rotation axis,
wherein the frame includes a second inclined portion inclined toward the axial direction of the second rotation axis in a circumferential direction around the second rotation axis,
the second transmission gear further includes a second contact portion provided to oppose the second inclined portion, and
the second contact portion is pushed by the second inclined portion in association with the rotation of the second transmission gear in the fourth direction.

5. A driving force transmission device according to claim 1,
wherein the connection drive section is configured to execute, in conjunction with movement of the moving member in the second direction, a connecting operation for connecting the first driving member to the first rotating member and a connecting operation for connecting the second driving member to the second rotating member.

6. A driving force transmission device according to claim 5,
wherein the first transmission gear of the first transmission section rotates around the first rotation axis in a fifth direction opposite to the third direction in association with the movement of the moving member in the second direction, and
the connecting section rotates the second transmission gear of the second transmission section around the second rotation axis in a sixth direction opposite to the fourth direction while rotating the first transmission gear in the fifth direction from the third angle to the second angle so as to connect the second driving member to the second rotating member.

7. A driving force transmission device according to claim 6,
wherein the first driving member is connected to the first rotating member in association with rotation of the first transmission gear from the second angle to the first angle.

8. A driving force transmission device according to claim 1,
wherein each of the first urging member and the second urging member is a spring member.

9. An image forming apparatus, comprising:
an apparatus main body;
an image forming section provided in the apparatus main body for forming an image on a sheet;
the driving force transmission device according to claim 1 provided in the apparatus main body;
the first rotating member; and
the second rotating member.

10. An image forming apparatus according to claim 9,
wherein the first rotating member is provided in the image forming section and is one of an image bearing member for bearing a toner image and a developing member rotated for supplying a toner to the image bearing member, and the second rotating member is the other of the image bearing member and the developing member.

11. An image forming apparatus according to claim 9, further comprising a cover capable of opening and closing the apparatus main body, wherein the moving member of the driving force transmission device is moved in the first direction in conjunction with an opening operation of the cover and is moved in the second direction in conjunction with a closing operation of the cover.

12. The driving force transmission device according to claim 1,
wherein the second transmission gear includes an extending portion extending from an outer circumferential portion of the second transmission gear in a radial direction of the second transmission gear, and the second fulcrum portion is disposed at a tip of the extending portion and projects from the extending portion in an axial direction of the second transmission gear.

13. The driving force transmission device according to claim 12, further comprising a driving gear configured to transmit a rotating driving force to the second rotating member, wherein the extending portion is in a substantially triangular shape and is provided on a side closer to the driving gear in the axial direction of the second transmission gear, and the second fulcrum portion projects from the extending portion toward the second rotating member.

* * * * *